US007016390B2

(12) United States Patent
Rhodes et al.

(10) Patent No.: US 7,016,390 B2
(45) Date of Patent: Mar. 21, 2006

(54) ULTRABRIGHT TUNABLE COHERENT MULTIKILOVOLT X-RAY SOURCE

(75) Inventors: Charles K. Rhodes, Chicago, IL (US); Keith Boyer, Santa Fe, NM (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 10/600,141

(22) Filed: Jun. 20, 2003

(65) Prior Publication Data

US 2004/0057470 A1 Mar. 25, 2004

Related U.S. Application Data

(60) Provisional application No. 60/390,609, filed on Jun. 21, 2002.

(51) Int. Cl.
*H01S 3/09* (2006.01)
(52) U.S. Cl. ............................................. 372/91; 372/5
(58) Field of Classification Search .................... 372/5, 372/91
See application file for complete search history.

(56) References Cited

U.S. PATENT DOCUMENTS 4,592,064 A * 5/1986 Silfvast ........................ 372/73
4,940,893 A * 7/1990 Lo ............................. 250/251
6,594,334 B1 * 7/2003 Ota ............................. 378/34

OTHER PUBLICATIONS

Borisov, A.B. et al. "Ultrahigh power compression for x-ray amplification: multiphoton cluster excitation combined with . . . " J of Phys, vol. 28, 1995, pp. 2143-2158.
McPherson, A. et al "Multiphoton-induced x-ray emission a . . . " Department of Physics, University of Illinois at Chicago, Letters to Nature, vol. 370, Aug. 25, 1994, pp. 631-634.
Kondo, K. et al. "Wavelength dependence of multiphoton-induced Xe(M) and Xe(L) emissions . . . " Letter to the Editor, Journal of Physics, vol. 30, No. 18, 11997, pp. L2707-L2716.
Borisov, A.B. et al. "Observation of relativistic and charge-displacement self-channeling . . . " Laboratory for Computer Simulation, Research Computer Center, Moscow State University, Moscow, Russia, General Physics Institute, Academy of Sciences of Russia, Moscow, Russia, Department of Physics, University of Illinois at Chicago, Illinois, Theoretical Division, Los Alamos National Laboratory, Los Alamos, New Mexico, Physical Review Letters, vol. 68, No. 15, Apr. 13, 1992.
Borisov, A.B. et al. "Stable relativistic/charge-displacement channels in ultrahigh power density . . . " Proc. National Academy of Sciences, vol. 95, Jul. 1998, pp. 7854-7859.

(Continued)

*Primary Examiner*—James Vannucci
(74) *Attorney, Agent, or Firm*—Samuel M. Freund; Cochran Freund & Young LLC

(57) ABSTRACT

The generation of ultrabright, multikilovolt coherent tunable x-radiation resulting from amplification on hollow atom transition arrays is described. Amplification has been demonstrated by physical evidence including (a) the observation of selected spectral components of several $Xe^{q+}$ hollow atom transition arrays (q=30, 31, 32, 34, 35, 36, 37) radiated axially from confined plasma channels, (b) the measurement of line narrowing that is spectrally correlated with the amplified transitions, (c) evidence for spectral hole-burning in the spontaneous emission, a manifestation of saturated amplification, that corresponds spectrally with the amplified lines, and (d) the detection of an intense narrow ($\delta\theta_x$~0.2 mr) directed beam of radiation in the far field of the source.

14 Claims, 22 Drawing Sheets

OTHER PUBLICATIONS

Borisov, A.B. et al. "Z-I of Xe(M) and Xe(L) emissions from channeled propagation of intense fem . . . " Letter to the Editor, Jour. of Physics, vol. 29, 1996, pp. L113-L118.

McPherson, A. et al. "Competition between multiphoton xenon cluster excitation and . . . " Letter to the Editor, Jour. of Phys, vol. 29, 1996, pp. L291-L297.

Borisov, A.B. et al. "Intensity dependence of the multiphoton-induced Xe(L) spectrum produced . . . " Letter to the Editor, Jour. of Phys, vol. 30, No. 17, 1997, pp. L767-L775.

Borisov, A.B. et al. "Stable self channeling of intense ultraviolet pulses in . . . " Journal of Optical Society of America, vol. 11, No. 10, Oct. 1994, pp. 1941-1947.

Boyer, K. et al. "Atomic inner-shell induced by coherent . . . " Dept. of Physics, University of Illinois at Chicago, Phys Review Letters, vol. 54, No. 14, Jan. 28, 1985, p 1490-1493.

Schroeder, W.A. et al. "Pump laser wavelength-dependent control of the efficiency of kilovolt . . . " Jour. of Physics, vol. 31, 1998, pp. 5031-5051.

Schroeder, W.A. et al. "An efficient, selective collisional ejection mechanism . . . " Journal of Physics B: Atomic, Molecular and Optical Physics, vol. 34, 2001, pp. 297-319.

Plechaty, E.F. et al. "Tables and Graphs of Photon-Interaction Cross Sections from 0.1 keV . . . " Lawrence Livermore Laboratory, Nov. 11, 1981.

Omenetto, F.G. et al. "High-brightness terawatt KrF* (248 nm) system," Applied Physics B, vol. 64, 1997 pp. 643-646.

Wagner, R, et al. "Electron acceleration by a laser wak . . . " Center for Ultrafast Optical Science, Physical Review Letters, The Amer Physical Soc, vol. 78, No. 16, pp. 3125-3128.

Cowan, R., "The theory of Atomic Structure and Spectra," University of California Press, Sep., 1981.

Wang, X. et al. "Electron acceleration and the propagation of ultrashort . . . "Physical Review Letters, The Amer Physical Soci, vol. 84, No. 23, Jun. 5, 2000, pp. 5324-5327.

McPherson A. et al. "Evidence of enhanced multiphoton (248 nm) coupling from single-pulse . . . " J. Phys. B. At. Mol. Opt. Phys. 30 (1997) pp. L767-L775.

Marowsky, G. et al. "Hohle Atome-Eine Neue Form von Hochangeregter Materie," Neue Zürcher Zeitung, No. 254, Nov. 1, 1995, S.42, with accompanying translation.

Boyer, K. et al. "Superstrong coherent multi-electron intense-field interaction" J. Phys. B. At. Mol. Opt. Phys. 27 (1994) pp. L633-636.

Borisov. A.B. et al. "Dynamics of optimized stable channel formation of intense laser pulses with the . . . " J. Phys. B. At. Mol. Opt. Phys. 32 (1999) pp. 3511-3525.

Borisov. A.B. et al. "Bifurication mode of relativistic and charge-displacement self-channeling." J. Phys. B. At. Mol. Opt. Phys. 34 (2001) pp. 2167-2176.

Solem, J.C. et al. "Prospects for X-Ray Amplification with Charge-Displacement Self Channeling." IEEE Jour. of Quan. Elec. vol. 25 No. 12 Dec. 1999 pp. 2423-2430.

Omenetto. F. et al. "Simultaneous generation of spectrally distinct third harmonics in a photonic crystal fiber." Opt. Lett. vol. 26 No. 15 Aug. 1, 2001 pp. 1158-1160.

Snyder. J.D. "Optical Waveguide Theory" Pub. 1983 by Chapman and Hall Ltd.

Schawlow. A.L. "Infrared and Optical Masers" Physical Review vol. 112 No. 6 Dec. 15, 1958, pp. 1940-1949.

Stockholm, L.V.H. "Formation of True X-Ray Images by Reflection on Crystal Mirrors" Zeitcchr. f. Kristallographie 101, 17 (1939) pp. 17-29.

Vinogradov, A.V. et al. "The problem of laser radiation sources in the far ultraviolet and X-ray regions." Soviet Physics Jetp vol. 36 No. 6 Jun. 1973 pp. 1115-1119.

International PCT Search Report Jan. 25, 2005.

* cited by examiner (a)
 (b)

1 μm (c)
 (d)

1 μm (e)
 (f)

20 μm    20 μm

US 7,016,390 B2

ULTRABRIGHT TUNABLE COHERENT MULTIKILOVOLT X-RAY SOURCE

RELATED CASES

The present patent application claims the benefit of Provisional Patent Application Ser. No. 60/390,609 filed on Jun. 21, 2002 for "Ultrabright Tunable Coherent Multikilovolt X-Ray Laser."

STATEMENT REGARDING FEDERAL RIGHTS

This invention was made in part with government support under Contract Numbers DEAC04-94AL85000 and BF 3611 awarded by the Sandia National Laboratory, and Contracts No. DMH04-94-G-0089 and DAAG55-97-1-0310 awarded by the Army Research Office to The Regents of The University of Illinois at Chicago Circle. The government has certain rights in the invention.

FIELD OF THE INVENTION

The present invention relates generally to x-ray sources and, more particularly, to the generation of ultrabright, multikilovolt coherent tunable x-radiation resulting from amplification on hollow atom transitions.

BACKGROUND OF THE INVENTION

Detailed molecular structural information of the living state is of great significance to the medical and biological communities. Since hydrated biologically active structures are small delicate complex three-dimensional (3D) entities, it is important to have molecular scale spatial resolution, high contrast, distortionless, direct 3D modalities of visualization of naturally functioning specimens in order to faithfully reveal their full molecular architectures. An x-ray holographic microscope equipped with an x-ray (angstrom range) laser as the illuminator would be uniquely capable of providing these images.

Accordingly, it is an object of the present invention to generate ultrabright, multikilovolt coherent tunable x-radiation.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the method for generating ultrabright, multikilovolt, coherent tunable radiation in the x-ray region of the electromagnetic spectrum hereof includes: generating pulsed laser radiation having a chosen power, pulsewidth and wavelength; generating atomic clusters having a chosen size and density; directing the laser radiation into the atomic clusters wherein atomic excitation is produced with selected inner-shell electron atomic electrons being removed from the atoms without the removal of all of the electrons in the next outermost shell, thereby generating a hollow atom array having a population inversion from which a chosen wavelength of radiation is emitted and amplified and wherein a self-trapped plasma channel region having a nonlinear mode of confined propagation for the chosen wavelength of amplified radiation is formed; and simultaneously controlling the density of the atomic clusters, the density of plasma electrons, and the pulsewidth, wavelength and power of the laser radiation such that the wavelength of amplified radiation is tunable over the accessible wavelengths for the hollow atom array.

In another aspect of the present invention in accordance with its objects and purposes, as embodied and broadly described herein, the apparatus for generating ultrabright, multikilovolt, coherent tunable radiation in the x-ray region of the electromagnetic spectrum hereof includes: a pulsed laser for generating radiation having a chosen power, pulsewidth and wavelength; means for generating atomic clusters having a chosen size and density; means for directing the laser radiation into the atomic clusters wherein atomic excitation is produced with selected inner-shell electron atomic electrons being removed from the atoms without the removal of all of the electrons in the next outermost shell, thereby generating a hollow atom array having a population inversion from which a chosen wavelength of is emitted and amplified, and wherein a self-trapped plasma channel region having a non-linear mode of confined propagation for the chosen wavelength of amplified radiation is formed; and means for controlling the density of the atomic clusters, the density of plasma electrons, and the pulsewidth, wavelength and power of the laser radiation such that the chosen wavelength of emitted and amplified radiation is tunable over the accessible wavelengths for the hollow atom array.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 4a shows a single-pulse image of Thomson-scattered 248 nm radiation viewed transversely to the direction of propagation of the incident pulse, while

FIG. 12a shows the spectral comparison of transversely emitted spontaneous emission with (film #4) and without (film #3) channel formation which illustrates spectral hole-burning for the $Xe^{36+}$, $Xe^{35+}$, and $Xe^{34+}$ (A and B) transitions visible in the emission without channel formation, whose computed positions are indicated by color coded bars, and which are suppressed or converted into corresponding dips (reversed) in the emission observed with channel formation; while

FIG. 13a is a backlighted Ti foil revealing a circular distribution of penetrating damage having an individual feature size of ~1 □m and an overall diameter of ~5 μm; FIG. 13b is a photograph of a classic circular TEM 03 mode, scaled to match the diameter of the pattern shown in FIG. 13a; FIG. 13c is a superposition of FIGS. 13a and 13b which illustrates the correspondence of the patterns; and FIG. 13d shows the comparative analogy with harmonic generation.

DETAILED DESCRIPTION

Figure 1:
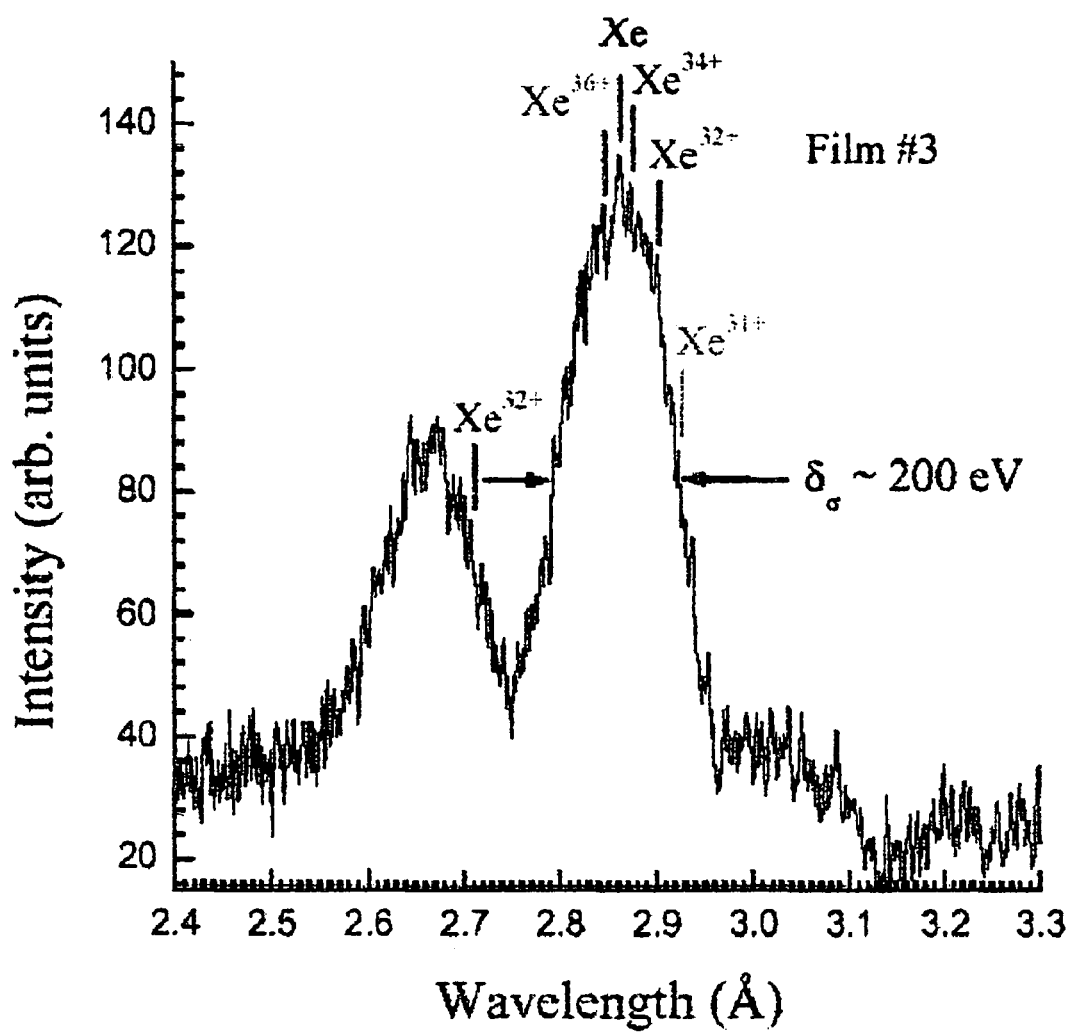
FIG. 1 illustrates the unamplified spontaneous emission profile of the Xe(L) 3d-2p hollow atom spectrum (film #3) produced from Xe clusters with femtosecond 248 nm excitation without plasma channel formation.

Briefly, the present invention includes a method and apparatus for generating ultrabright multikilovolt coherent tunable x-radiation. Physical evidence, that includes (a) the observation of strong enhancement of selected spectral components of several $Xe^{q+}$ hollow atom transition arrays (q=31, 32, 34, 35, 36, 37) radiated axially from confined plasma channels, (b) the measurement of line narrowing that is spectrally correlated with the amplified transitions, (c) evidence for spectral hole-burning in the spontaneous emission, a manifestation of saturated amplification, that corresponds spectrally with the amplified lines, and (d) the detection of an intense narrow (δθ'~0.2 mr) directed beam of radiation, (1) experimentally demonstrates amplification of multikilovolt x-rays for wavelengths between λ~2.71 and λ~2.93 Å ($\hbar\omega_x \cong 4230$–4570 eV); and (2) proves the feasibility of a compact x-ray illuminator that can achieve the mission of biological x-ray microholography. The measurements also (α) establish the property of tunability in the quantum energy over a substantial fraction of the spectral region exhibiting amplification ($\Delta\hbar\omega_x$~345 eV); and (β) demonstrate the coherence of the x-ray output through the observation of a canonical spatial mode pattern. An analysis of the physical scaling revealed by these results indicates that the capability of the x-ray source potentially includes single-molecule microimaging for the in situ structural analysis of membrane proteins, an important class of drug targets. An estimate of the peak brightness achieved in these initial measurements gives a value of ~$10^{31}$–$10^{32}$ photons·$s^{-1}$·$mm^{-2}$·$mr^{-2}$ $(0.1\%$ Bandwidth$)^{-1}$, a magnitude that is ~$10^7$–$10^8$-fold higher than presently available synchrotron technology.

Hollow atoms are atoms (ions) that intrinsically possess an "inverted" electronic configuration consisting of deeply bound inner-shell vacancies, perhaps multiple, with the simultaneous retention of several electrons in relatively weakly bound outer orbitals. Accordingly, these states are suited for the prompt emission and amplification of x-rays.

Reference will now be made in detail to the present preferred embodiments of the invention examples of which are illustrated in the accompanying drawings. In what follows, identical callouts are used to identify similar or identical structure. Conditions for x-ray amplification in the multikilovolt spectral region combine the production of cold, low opacity, spatially directionally organized, and vigorously ($10^{19}$–$10^{20}$ W/$cm^3$) inner-shell state-selectively excited high-Z matter [See, e.g., A. L. Schawlow and C. H. Townes, "Infrared and Optical Masers," *Phys. Rev.* 112, 1940 (1958), and A. V. Vinogradov and I. I. Sobel'man, *Zh. Eksp. Teor Fiz.* 63, 2113 (1972) [English transl.: *Sov. Phys. JETP* 36, 1115 (1973).]]. That is, high power compression is controllably produced in appropriately configured materials. The present invention combines [See, e.g., A. B. Borisov, et al., "Ultrahigh Power Compression for X-Ray Amplification: Multiphoton Cluster Excitation Combined with Non-Linear Channeled Propagation," *J. Phys. B* 28, 2143 (1995) .]: (α) the direct multiphoton excitation of hollow atoms from clusters [See, e.g., A. McPherson, et al., "Multiphoton-Induced X-Ray Emission at 4–5 keV from Xe Atoms with Multiple Core Vacancies," *Nature* 370, 631 (1994). "Hollow atoms" are atoms that intrinsically possess an "inverted" electronic configuration consisting of deeply bound inner-shell vacancies, perhaps multiple, with the simultaneous retention of several electrons in relatively weakly bound outer orbitals. These states are optimally suited for the prompt emission of x-rays.] with ultraviolet radiation [See, e.g., K. Kondo et al., "Wavelength Dependence of Multiphoton-Induced Xe(M) and Xe(L) Emissions from Xe Clusters," *J. Phys. B* 30, 2707 (1997).], and (β) a nonlinear mode of confined propagation in plasmas resulting from relativistic/charge-displacement self-channeling [See, e.g., A. B. Borisov et al., "Observation of Relativistic and Charge-Displacement Self-Channeling of Intense Subpicosecond Ultraviolet (248 nm) Radiation in Plasmas," *Phys.*

Rev. Lett. 68, 2309 (1992) and A. B. Borisov et al., "Stable Relativistic/Charge-Displacement Channels in Ultrahigh Power Density ($\sim 10^{21}$ W/cm$^3$) Plasmas," *Proc. Natl. Acad. Sci. USA* 95, 7854 (1998).].

The system composed of Xe hollow atom states, that produces the characteristic Xe(L) spontaneous emission spectrum at $\lambda \cong 2.9$ Å illustrated in FIG. 1 and arises from the excitation of Xe clusters with an intense pulse of 248 nm radiation propagating in a self-trapped plasma channel has been chosen to exemplify the apparatus and method of the present invention. More specifically, FIG. 1 shows the unamplified spontaneous emission profile of the Xe(L) 3d-2p hollow atom [See, e.g., A. McPherson et al., "Multiphoton-Induced X-Ray Emission at 4–5 keV from Xe Atoms with Multiple Core Vacancies," *Nature* 370, 631 (1994).] spectrum (film #3) produced from Xe clusters with femtosecond 248 nm excitation without plasma channel formation. The splitting between the major and minor lobes arises from the spin-orbit interaction of the 2p vacancy. The full width of the main feature is $\delta_o \sim 200$ eV. The positions of selected charge state transition arrays (Xe$^{31+}$, Xe$^{32+}$, Xe$^{34+}$, Xe$^{35+}$ and Xe$^{36+}$) are indicated.

From a detailed examination of Xe(L) spectral data [See, e.g., K. Kondo et al., "Wavelength Dependence of Multiphoton-Induced Xe(M) and Xe(L) Emissions from Xe Clusters," *J. Phys. B* 30, 2707 (1997), A. B. Borisov et al., "Z-λ Imaging of Xe(M) and Xe(L) Emissions from Channeled Propagation of Intense Femtosecond 248 nm Pulses in a Xe Cluster Target," *J. Phys. B* 29,L113 (1996), and A. B. Borisov et al., "Intensity Dependence of the Multiphoton-Induced Xe(L) Spectrum Produced by Subpicosecond 248 nm Excitation of Xe Clusters," *J. Phys. B* 29,L43 (1996).], theoretical analyses of the mechanisms of cluster excitation [See, e.g., A. B. Borisov et al., "Ultrahigh Power Compression for X-Ray Amplification: Multiphoton Cluster Excitation Combined with Non-Linear Channeled Propagation," *J. Phys. B* 28, 2143 (1995), K. Boyer and C. K. Rhodes, "Atomic Inner-Shell Excitation Induced by Coherent Motion of Outer-Shell Electrons," *Phys. Rev. Lett.* 54, 1490 (1985), W. Andreas Schroeder et al., "Pump Laser Wavelength-Dependent Control of the Efficiency of Kilovolt X-Ray Emission from Atomic Clusters," *J. Phys. B* 31 5031 (1998), and W. A. Schroeder et al., "An Efficient, Selective Collisional Ejection Mechanism for Inner-Shell Population Inversion in Laser-Driven Plasmas," *J. Phys. B* 34, 297 (2001).] and channeled propagation [See, e.g., A. B. Borisov et al., "Ultrahigh Power Compression for X-Ray Amplification: Multiphoton Cluster Excitation Combined with Non-Linear Channeled Propagation," *J. Phys. B* 28, 2143 (1995), A. B. Borisov et al., "Stable Relativistic/Charge-Displacement Channels in Ultrahigh Power Density ($\sim 10^{21}$ W/cm$^3$) Plasmas," *Proc. Natl. Acad. Sci. USA* 95, 7854 (1998), and W. A. Schroeder et al., "An Efficient, Selective Collisional Ejection Mechanism for Inner-Shell Population Inversion in Laser-Driven Plasmas," *J. Phys. B* 34, 297 (2001).], and calibrated measurements of the Xe(L) energy yield [See, e.g., A. McPherson et al., "Evidence of Enhanced Multiphoton (248 nm) Coupling from Single-Pulse Energy Measurements of Xe(L) Emission Induced from Xe Clusters," *J. Phys. B* 30, L767 (1997).], the exponential gain constant go is estimated to reach a value of $g_o = 60 \pm 20$ cm$^{-1}$, a range approximately two orders of magnitude above the competing absorptive losses [See, e.g., E. F. Plechaty et al., "Tables and Graphs of Photon-Interaction Cross Sections from 0.1 keV to 100 MeV Derived from the LLL Evaluated-Nuclear-Data Library," *Rev.* 3 Vol. 6 (UCRL-50400), (1981).].

Figure 2:
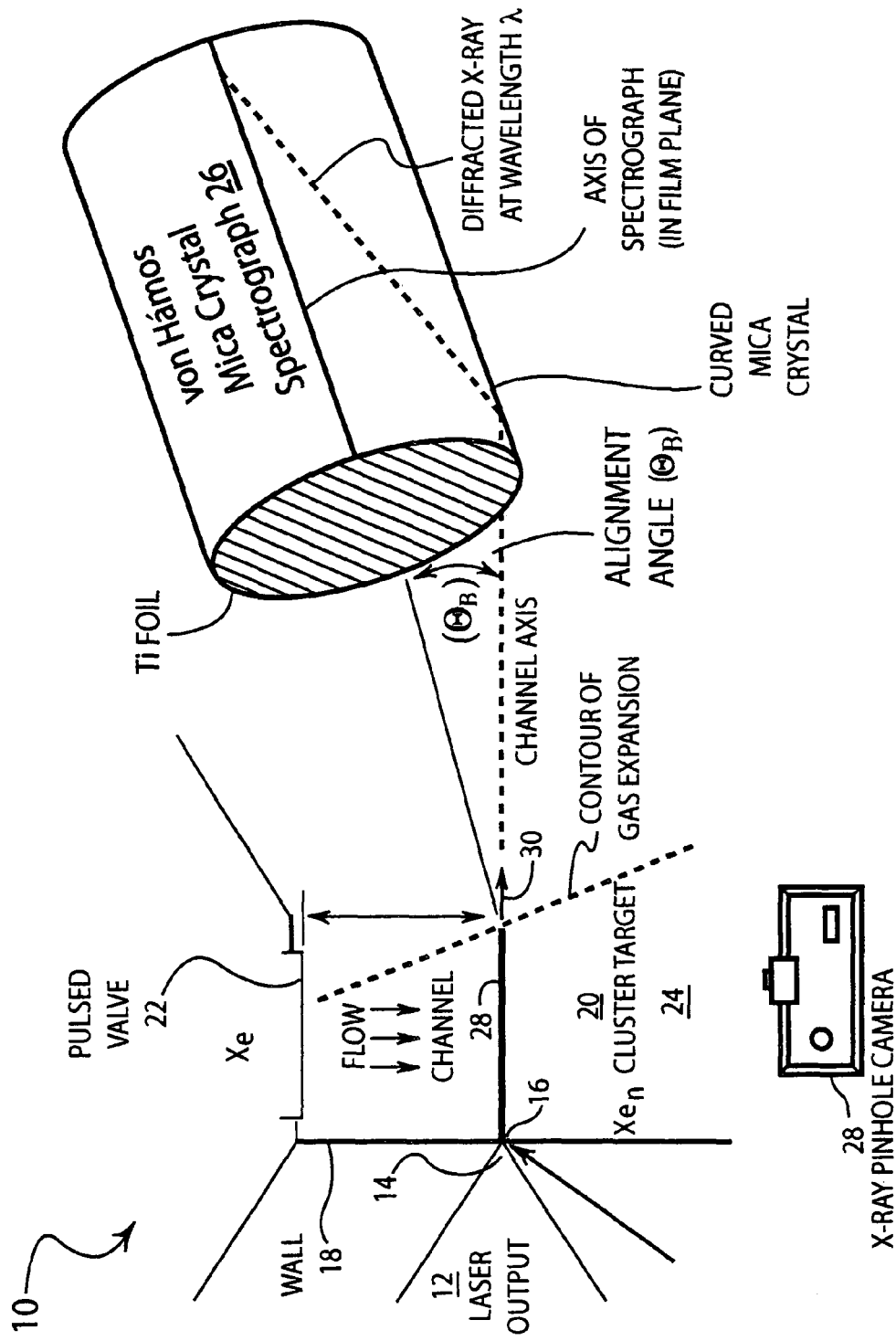
FIG. 2 is a schematic representation of the apparatus of the present invention used for the observation of amplification of Xe(L) radiation in self-trapped channels inside an evacuated chamber.

A schematic representation of the apparatus, 10, of the present invention used for the observation of amplification of Xe(L) radiation in self-trapped channels inside an evacuated chamber is shown in FIG. 2. Output, 12, from a femtosecond ultraviolet (248 nm) laser source [See, e.g., F. G. Omenetto et al. "High Brightness Terawatt KrF*(248 nm) System," *Applied Optics* B 64, 43 (1997).] capable of delivering pulses having a maximum energy of ~400 mJ, a temporal duration of ~230 fs, and a peak brightness of ~$8.5 \times 10^{21}$ W·cm$^{-2}$·sr$^{-1}$ at a pulse rate of 0.4 Hz was focused, 14, to an ~3 µm spot and directed through an 200 µm aperture, 16, in wall, 18, of apparatus 10 using an f/3 off-axis parabolic optic (not shown). The wall defining the entrance plane was fabricated from ~100 µm thick steel. The gaseous xenon cluster (Xe$_n$) target, 20 [See, e.g. A. B. Borisov et al., "Ultrahigh Power Compression for X-Ray Amplification: Multiphoton Cluster Excitation Combined with Non-Linear Channeled Propagation," *J. Phys.* B 28, 2143 (1995) and A. McPherson et al., "Multiphoton-Induced X-Ray Emission at 4–5 keV from Xe Atoms with Multiple Core Vacancies," *Nature* 370, 631 (1994).], was provided by a pulsed valve, 22, having an aperture of 1.5 mm that was operated at a maximum backing pressure of ~125 psia, producing an average Xe density $\rho_{Xe} \sim 3$–$6 \times 10^{19}$ cm$^{-3}$ composed principally of clusters in evacuated chamber, 24.

X-ray spectra were recorded in third order diffraction [See, e.g., A. B. Borisov et al., "Z-λ Imaging of Xe(M) and Xe(L) Emissions from Channeled Propagation of Intense Femtosecond 248 nm Pulses in a Xe Cluster Target," *J. Phys. B* 29,L113 (1996).] by two identical von Hámos spectrographs placed about 2.5 cm from the exit of the channel, and equipped with mica crystals and Kodak RAR 2492 film. The film holder incorporated a shield composed of a 50 µm thick layer of Kaptan covered by a 1 µm film of polycarbonate coated with 0.2 µm of Al. The entrance of von Hámos spectrograph, 26, viewing the forward directed emission was protected with a Ti foil of 12.7 µm thickness having a transmission factor in the 2.7–3.0 Å region of ~0.5. The Bragg angle for the Xe$^{34+}$ component at 2.88 A is $\theta_B \cong 26°$. The film plane, which lies on the axis of the instrument, does not have a direct path to the x-ray source and, hence, only receives exposure by diffraction from the curved mica crystal. A second, identical von Hámos spectrograph (not shown), equipped with Muscovite mica from the same cut, was used to record the spontaneous emission emitted transversely with respect to the channel axis. Not shown is a film pack used for measurement of the amplified x-ray beam, comprising a 2 cm square, 12.7 µm thick Ti foil backed by a matching piece of x-ray film. With removal of the axial von Hámos spectrograph, the film-pack detector was placed on the channel axis in a perpendicular orientation at a distance of about 12.5 cm from the cluster target.

X-ray pinhole camera, 28, was used to record radiation emitted radially to the long dimension of channel, 28, (located approximately 1.5 mm from pulsed valve 22) which guides amplified x-radiation, 30. The x-ray pinhole camera was equipped with a ~10 µm thick Be foil enabling the morphology of the channel to be visualized by the Xe(M) emission (~1 keV). The observed channel length, I, was typically between 1.5 and 2.5 mm in length. Some control of the boundaries of the channel have been found to reduce the loss of energy of the amplified beam. In the present apparatus, the presence of wall 18 having aperture 16 assists in this function.

Several factors influence the focusing properties of the von Hámos spectrograph and consequently, the x-ray exposure recorded on the film [L. von Hámos, "Röntgenspektroskopie und Abbildung mittels gekrümmter Kristallreflektoren," *Ann. Physik* 17, 716 (1933) and L. von Hámos, "Formation of True X-ray Images by Reflection on Crystal Mirrors," *Zeitschr. f. Kristallographie* 101, 17 (1939).]. They are (1) the radiating volume constitutes an extended source; (2) the spectrograph functions with characteristic aberrations; (3) perfect alignment and positioning of the x-ray source and channel with respect to the axis of the spectrograph are not experimentally feasible; and (4) the experimental results indicate that the axis of the plasma channel fluctuates in angular direction with a magnitude that can be as large as ~1–2°, a range considerably in excess of the tolerance of the Bragg condition for a spectrally narrow line. At the large scattering angles ($\theta$~1) utilized by the spectrograph in the collection of radiation from the present isotropic source, the effect of a vertical misalignment can become significant by contributing an additional shift. Overall, a distributed $4\pi$-source can be expected to exhibit a transverse width to the exposure, and the measurements described hereinbelow indicate a typical effective value of ≅200–500 $\mu$m for the experimental accuracy. Misalignments on the order of this magnitude insignificantly influence the spectral positions of the exposures. Since the experimentally demonstrated instrumental spectral resolution is ~4 eV, spectral shifts introduced by uncertainties in alignment are entirely negligible. Thus, a highly spatially localized spectrally sharp (~4 eV) x-ray source that emits with high directionality (<1 mr), such as one consisting of a narrow beam emerging from the exit of an amplifying micron-scale plasma channel, provided that the required Bragg condition is simultaneously satisfied, will form a faithful image on the film, although the location of this image may be displaced by a distance from the center of the line of exposure recorded from the isotropically radiated spontaneous emission. A sequence of pulses at a fixed wavelength $\lambda_o$, whose individual source locations (channel exit positions) and directionalities differ, will appear as a line of individual exposures on the film. The data for film #11A in FIG. 10$b$ hereof provide an example of this pattern of exposure.

Figure 3:
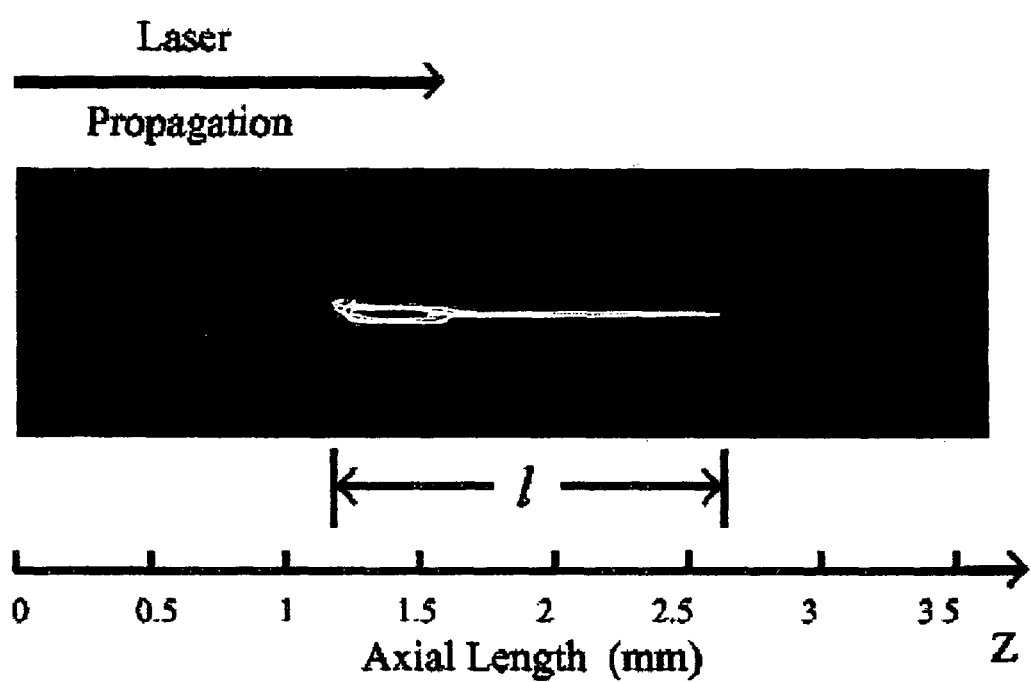
FIG. 3 is a single-exposure x-ray image of a representative stable slender channel emitting Xe(M) radiation (~1 keV) produced in a gaseous target containing $Xe_n$ clusters by an incident 248 nm pulse.

A. Plasma Channel Formation, Propagation, and Termination:

FIG. 3 shows a single-pulse x-ray image of a representative stable slender confined channel emitting Xe(M) radiation (~1 keV) produced in a gaseous target containing Xe$_n$ clusters recorded using x-ray pinhole camera 26 shown in FIG. 2 hereof with 248 nm radiation [See, e.g., A. B. Borisov et al., "Ultrahigh Power Compression for X-Ray Amplification: Multiphoton Cluster Excitation Combined with Non-Linear Channeled Propagation," *J. Phys. B* 28, 2143 (1995), A. B. Borisov et al., "Stable Self-Channeling of Intense Ultraviolet Pulses in Underdense Plasma Producing Channels Exceeding 100 Rayleigh Lengths," *JOSA B* 11, 1941 (1994), and W. A. Schroeder et al., "An Efficient, Selective Collisional Ejection Mechanism for Inner-Shell Population Inversion in Laser-Driven Plasmas," *J. Phys. B* 34, 297 (2001).]. The incident 248 nm pulse for this recording had a duration of ~230 fs, an energy of ~350 mJ, and was focused with f/3 off-axis parabolic mirror at the position Z≅1 mm. The observed length of the channel in this case (l≅1.5 mm) exceeds 50 Rayleigh ranges. The typical range of lengths, l, observed in these experiments was between 1.5 and 2.5 mm. The x-ray pinhole camera had an aperture with a diameter of 25 $\mu$m and a corresponding spatial resolution of ~30 $\mu$m. The high-intensity L-shell emitting core [See, e.g. A. B. Borisov et al., "Z-$\lambda$ Imaging of Xe(M) and Xe(L) Emissions from Channeled Propagation of Intense Femtosecond 248 nm Pulses in a Xe Cluster Target," *J. Phys.* B 29,L113 (1996).] of the channel is too small to be resolved in this image.

These channels, which possess an inner high-intensity (~$10^{19}$–$10^{20}$ W/cm$^2$) core [6,9] having a diameter d~1.8 $\mu$m, control a power density of ~$10^{19}$–$10^{20}$ W/cm$^3$, the level required for strong amplification in the multikilovolt range [See, e.g., A. V. Vinogradov and I. I. Sobel'man, *Zh. Eksp. Teor. Fiz.* 63, 2113 (1972) [English transl.: *Sov. Phys. JETP* 36, 1115 (1973)].]. Evaluation of the coupling between the channeled ultraviolet radiation and the clusters [See, e.g., A. B. Borisov et al., "Z-$\lambda$ Imaging of Xe(M) and Xe(L) Emissions from Channeled Propagation of Intense Femtosecond 248 nm Pulses in a Xe Cluster Target," *J. Phys.* B 29,L113 (1996), A. B. Borisov et al., "Intensity Dependence of the Multiphoton-Induced Xe(L) Spectrum Produced by Subpicosecond 248 nm Excitation of Xe Clusters," *J. Phys.* B 29,L43 (1996), A. McPherson et al., "Evidence of Enhanced Multiphoton (248 nm) Coupling from Single-Pulse Energy Measurements of Xe(L) Emission Induced from Xe Clusters," *J. Phys.* B 30, L767 (1997), and K. Boyer and C. K. Rhodes, "Superstrong Coherent Multi-Electron Intense-Field Interaction," *J. Phys.* B 27, L633 (1994).] indicates an atom-specific power of ~1 W/atom, a value confirmed by measurements of enhanced emission from double-vacancy states [See, e.g., A. McPherson et al., "Multiphoton-Induced X-Ray Emission at 4–5 keV from Xe Atoms with Multiple Core Vacancies," *Nature* 370, 631 (1994) and A. McPherson et al., "Multiphoton-Induced X-Ray Emission at 4–5 keV from Xe Atoms with Multiple Core Vacancies," *Nature* 370, 631 (1994).] described below. The incorporation of the length indicated by the ~1 keV Xe(M) emission (l≅1.5–2.5 mm) with the bounds given above for the gain constant $g_o$ yields an exponent for amplification in the range $6 \leq g_o l \leq 20$. The magnitude of this estimate suggests saturated amplification in a channel of the form shown in FIG. 3 hereof.

Images of the Thomson scattered light [See, e.g., A. McPherson et al., "Evidence of Enhanced Multiphoton (248 nm) Coupling from Single-Pulse Energy Measurements of Xe(L) Emission Induced from Xe Clusters," *J. Phys.* B 30, L767 (1997).] generated by the interaction of the 248 nm radiation propagating in the channels with the ambient electron density provide relevant data on the dynamics of the formation, propagation, and termination of the channels. The recorded Thomson-scattered profile, viewed transversely to the direction of propagation of the incident 248 nm pulse, corresponds to conditions for which strong channeling occurs and is shown in FIG. 4$a$. The image shows (1) spurious wall scattering of the incident 248 nm pulse (~230 fs) arising from its entrance to the zone of interaction (2) through aperture 16 of FIG. 2, and the sudden collapse (3) into the narrow channel (4) having length $l_{ch}$. The average Xe atom density was ~$1.2 \times 10^{19}$ cm$^{-3}$. Conditions were adjusted to provide a good display of the formation and termination of the channel, not to maximize the channel length.

Figure 4A:
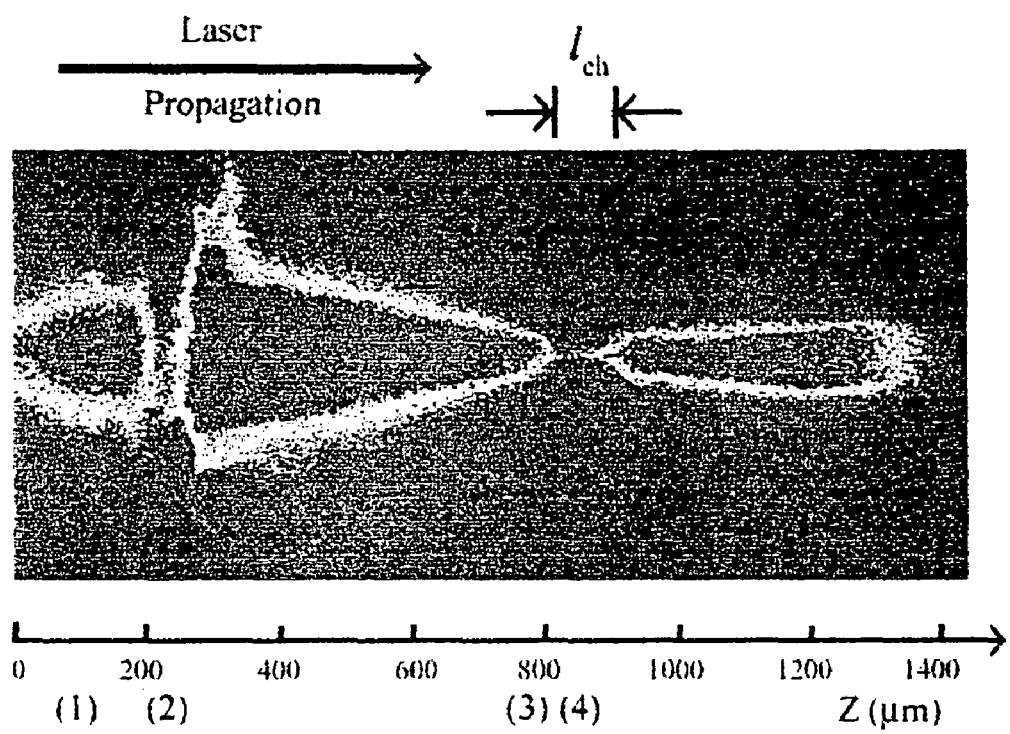
Figure 4B:
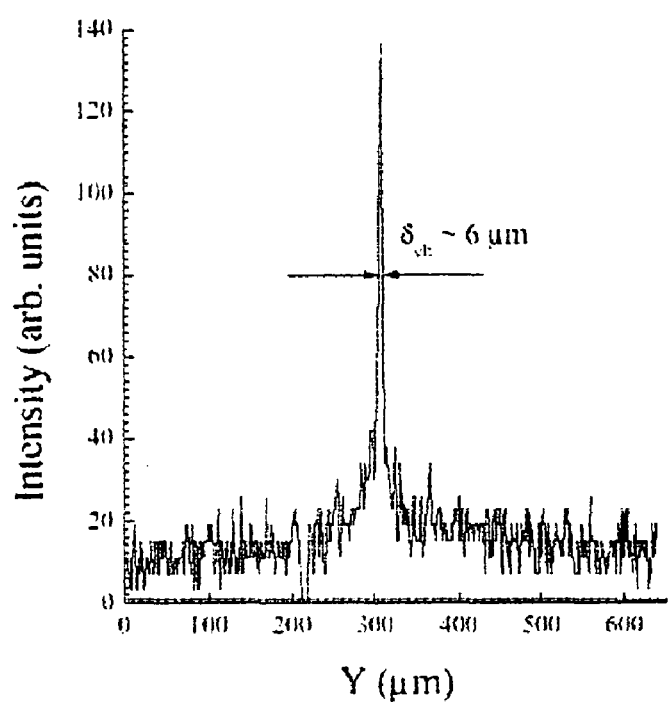
FIG. 4b shows a transverse lineout at the thin channeled region at Z=863 $\mu$m.

The measured diameter $\delta_{ch}$ of the narrow zone $l_{ch}$ shown in FIG. 4$b$ at Z=863 $\mu$m (FIG. 4$a$) gives a channel width of $\delta_{ch}$~6 $\mu$m corresponding to the spatial resolution of the imaging system. The high contrast of the signal characteristic of the region $l_{ch}$, in which the isolated channel has developed, indicates that the nonlinear focusing action efficiently conducts the energy into the channel and that the mechanism governing this structure is stable [See, e.g., A. B. Borisov et al., "Stable Relativistic/Charge-Displacement Channels in Ultrahigh Power Density (~$10^{21}$ W/cm$^3$) Plasmas," *Proc. Natl. Acad. Sci. USA* 95, 7854 (1998), A. B. Borisov et al., "Dynamics of Optimized Stable Channel Formation of Intense Laser Pulses with the Relativistic/Charge-Displacement Mechanism," *J. Phys. B* 32, 3511 (1999), and A. B. Borisov et al., "Bifurcation Mode of Relativistic and Charge-Displacement Self-Channeling," *J. Phys. B* 34, 2167 (2001).]. Examination of the termination of the channel, which commences at $Z \cong 900$ $\mu$m in FIG. 4a, shows (a) that the 248 nm energy rapidly diffracts [See, e.g., A. B. Borisov et al., "Observation of Relativistic and Charge-Displacement Self-Channeling of Intense Subpicosecond Ultraviolet (248 nm) Radiation in Plasmas," *Phys. Rev. Lett.* 68, 2309 (1992).] from the narrow channel at an angle comparable to the angular acceptance of the focusing optic (f/3) used to initiate the channel; and (b) that filaments are not formed.

B. Support for a Conclusion of X-Ray Amplification:

Experimental data of several forms have been obtained which constitute evidence of amplification in the plasma channel on several transitions of the Xe(L) hollow atom spectrum at wavelengths in the range $\lambda \sim 2.71$–$2.93$ Å. Specifically, they are: ($\alpha$) strongly enhanced spectra arising from $Xe^{31+}$, $Xe^{32+}$, $Xe^{34+}$, $Xe^{35+}$, $Xe^{36+}$, and $Xe^{37+}$ ions recorded from the channel in the forward (axial) direction, as shown, for example, for the $Xe^{34+}$ array at $\lambda \sim 2.88$ Å in FIG. 5, and the $Xe^{32+}$ array at $\lambda \cong 2.71$ A in FIG. 6; ($\beta$) the measurement of a corresponding spectral narrowing on the directionally enhanced lines emitted from the channel; ($\gamma$) evidence for saturation of three of these transition arrays ($Xe^{34+}$, $Xe^{35+}$, $Xe^{36+}$) given by the simultaneous quenching (spectral hole-burning) of the corresponding spontaneous emission from them in transversely recorded spectra only when amplifying channels are present, observations that correlate fully with the measured spectral narrowing; and ($\delta$) small-scale structural damage to both (i) the 12.7 $\mu$m thick Ti foil located at a separation of ~2.5 cm from the source at the entrance to an axially located von Hámos spectrometer and, with the von Hámos spectrometer removed, (ii) similar Ti foils protecting film packs axially positioned at a distance of 12.5 cm from the cluster target.

Figure 5A:
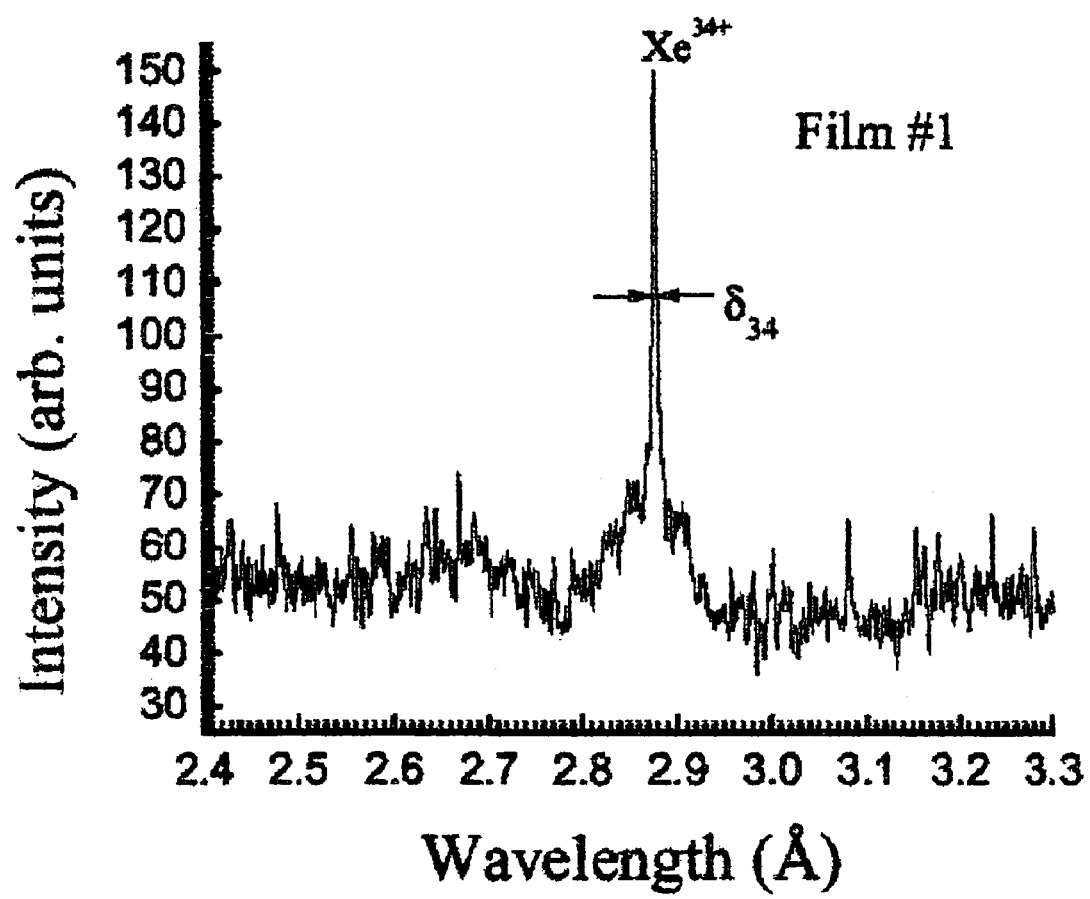
FIG. 5a shows the Xe(L) spectrum (film #1) recorded with a mica von Hámos spectrometer with an estimated spectral resolution of ~4 eV in the forward (axial) direction from the plasma channel.

More specifically, FIG. 5a shows the Xe(L) spectrum (film #1) recorded with a mica von Hámos spectrometer with an estimated spectral resolution of ~4 eV in the forward (axial) direction from the plasma channel. The film exposure in panel (b) indicates that a single amplified $Xe^{34+}$ pulse ($\lambda \cong 2.88$ Å) is recorded along with ~400 pulses of isotropically radiated spontaneous emission. Further, since the von Hámos spectrometer is a focusing instrument that collects the spontaneous emission over a large angular region (~$10^3$ mr) and the amplified $Xe^{34+}$ signal, as indicated by the damage pattern observed on the Ti foils, is directed into a small solid angle (<1 mr), the corrected true strength of the narrow $Xe^{34+}$ feature is ~$4 \times 10^5$ greater than shown. This indicates a gain in amplitude of ~$10^6$. The width (FWHM) of the narrow $Xe^{34+}$ feature is $\delta_{34} = 8.4$ eV. The identification of the enhanced feature with the $Xe^{34+}$ array is based on earlier spectroscopic studies [See, e.g., K. Kondo et al., "Wavelength Dependence of Multiphoton-Induced Xe(M) and Xe(L) Emissions from Xe Clusters," *J. Phys. B* 30, 2707 (1997), and A. B. Borisov et al., "Z-$\lambda$ Imaging of Xe(M) and Xe(L) Emissions from Channeled Propagation of Intense Femtosecond 248 nm Pulses in a Xe Cluster Target," *J. Phys. B* 29, L113 (1996).].

Figure 5B:
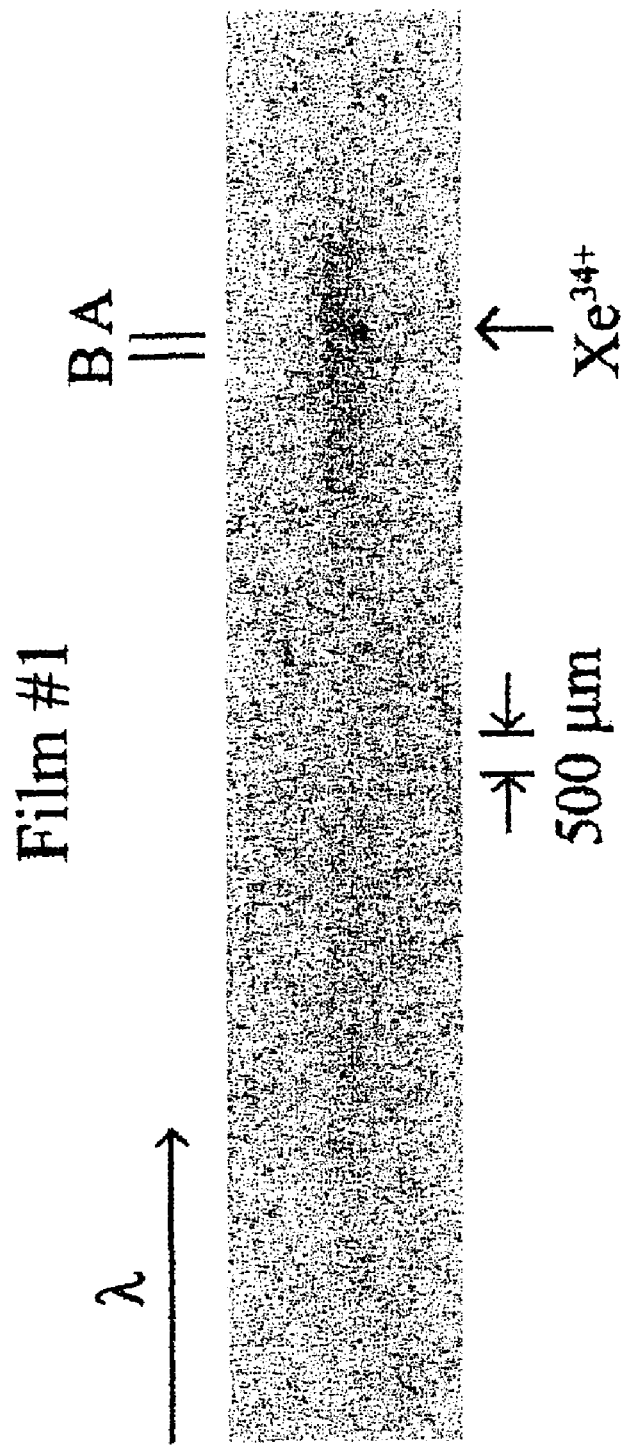
FIG. 5b is the exposure recorded on film #1 which gives rise to the spectrum shown in FIG. 5a, and FIG. 5c shows the superposition of transverse sections A and B indicated in FIG. 5b.
Figure 5C:
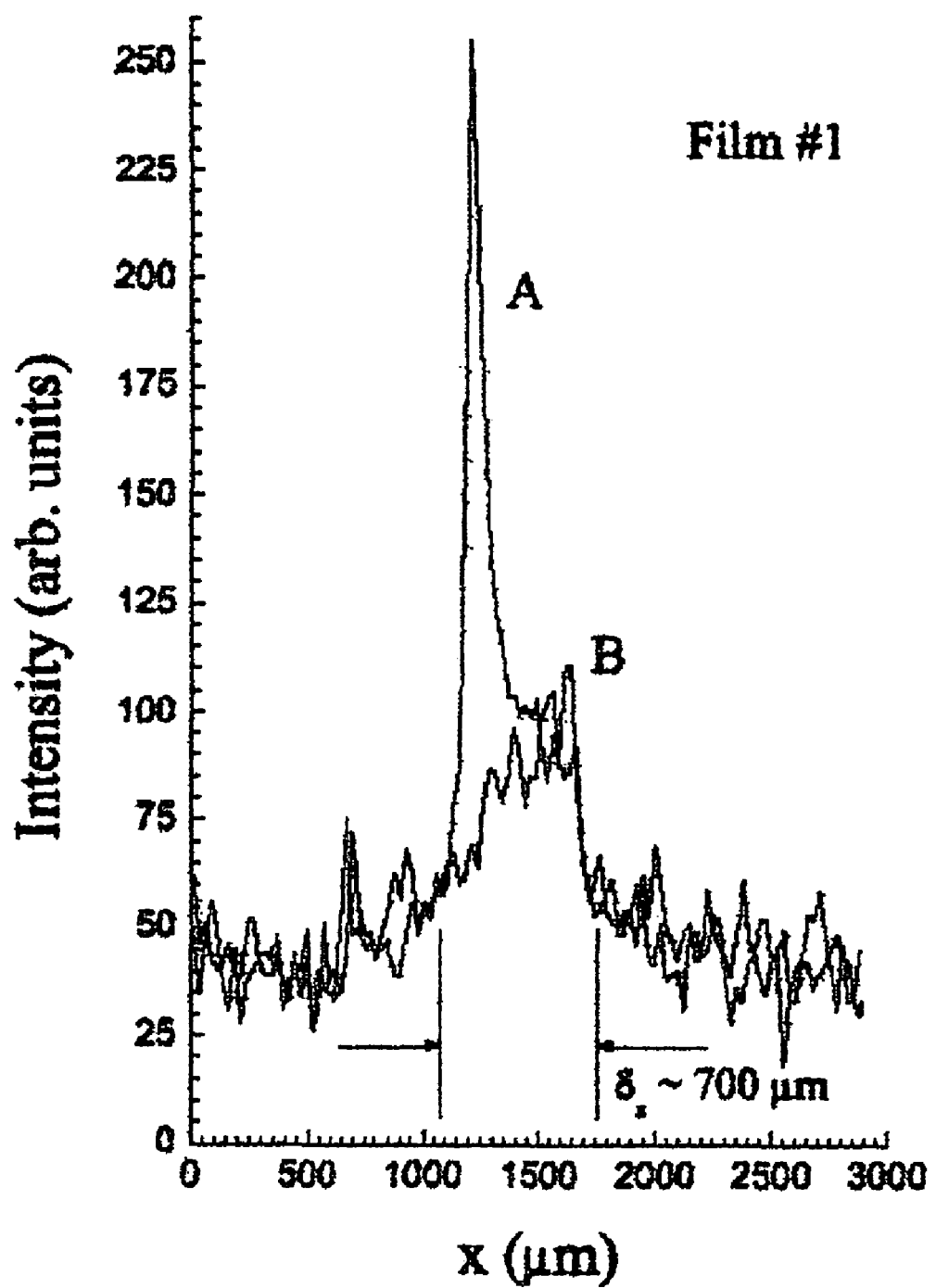

FIG. 5b shows the detail of the exposure recorded on film #1 which gives rise to the spectrum shown in FIG. 5a. The morphology of the isolated $Xe^{34+}$ feature indicates that the exposure corresponding to the observed enhancement was generated on a single pulse. Spectral positions A and B designate the locations of the transverse (spatial) sections of the spectrum shown in FIG. 5c which shows the superposition of transverse sections A and B shown in FIG. 5b. Section A corresponds to the wavelength of the enhanced $Xe^{34+}$ feature in FIG. 5a. Section B gives the width is $\delta_s$ of the exposure from the isotropic source. The spatial position of the amplified $Xe^{34+}$ line falls within the region defined by the width $\delta_s$ of the isotropic emission.

Figure 6A:
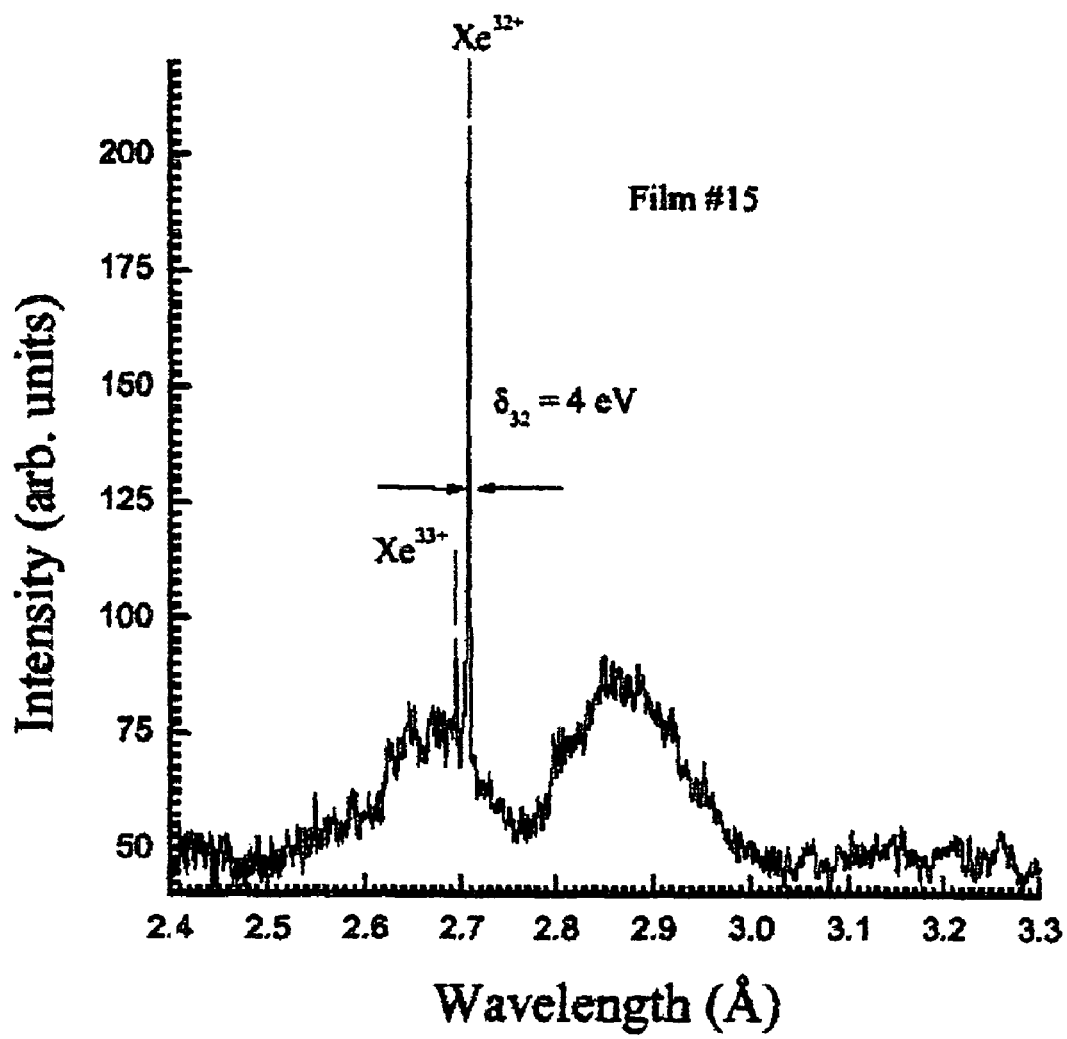
FIG. 6a shows the Xe(L) spectrum (film #15) recorded with an estimated spectral resolution of ~4 eV in the forward (axial) direction from the plasma channel.

FIG. 6a shows the Xe(L) spectrum (film #15) recorded with an estimated spectral resolution of ~4 eV in the forward (axial) direction from the plasma channel. The film exposure in FIG. 7b, in conjunction with the discussion of the data presented below in FIG. 14, indicates that a single amplified $Xe^{32+}$ pulse ($\lambda \cong 2.71$ Å) is recorded along with ~1200 pulses of isotropically radiated spontaneous emission. Further, since the von Hámos spectrometer is a focusing instrument that collects the spontaneous emission over a large angular region (~$10^3$ mr) and the amplified $Xe^{32+}$ signal, as indicated by the damage pattern observed on the Ti foils, is directed into a small solid angle (<1 mr), the corrected true strength of the narrow $Xe^{32+}$ feature is ~$1.2 \times 10^6$ greater than shown. This indicates a gain in amplitude of ~$6 \times 10^6$. The width (FWHM) of the narrow $Xe^{32+}$ feature is $\delta_{32} \cong 4.0$ eV.

Figure 6B:
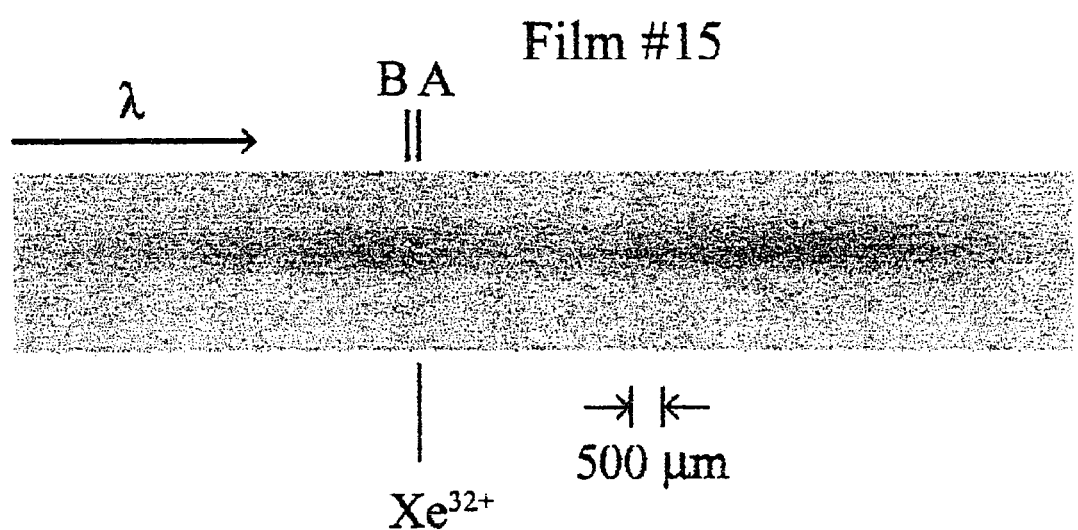
FIG. 6b shows the detail of the exposure recorded on film #15 which gives the spectrum shown in FIG. 6a, and FIG. 6c shows the superposition of transverse sections A and B indicated in FIG. 6b.
Figure 6C:
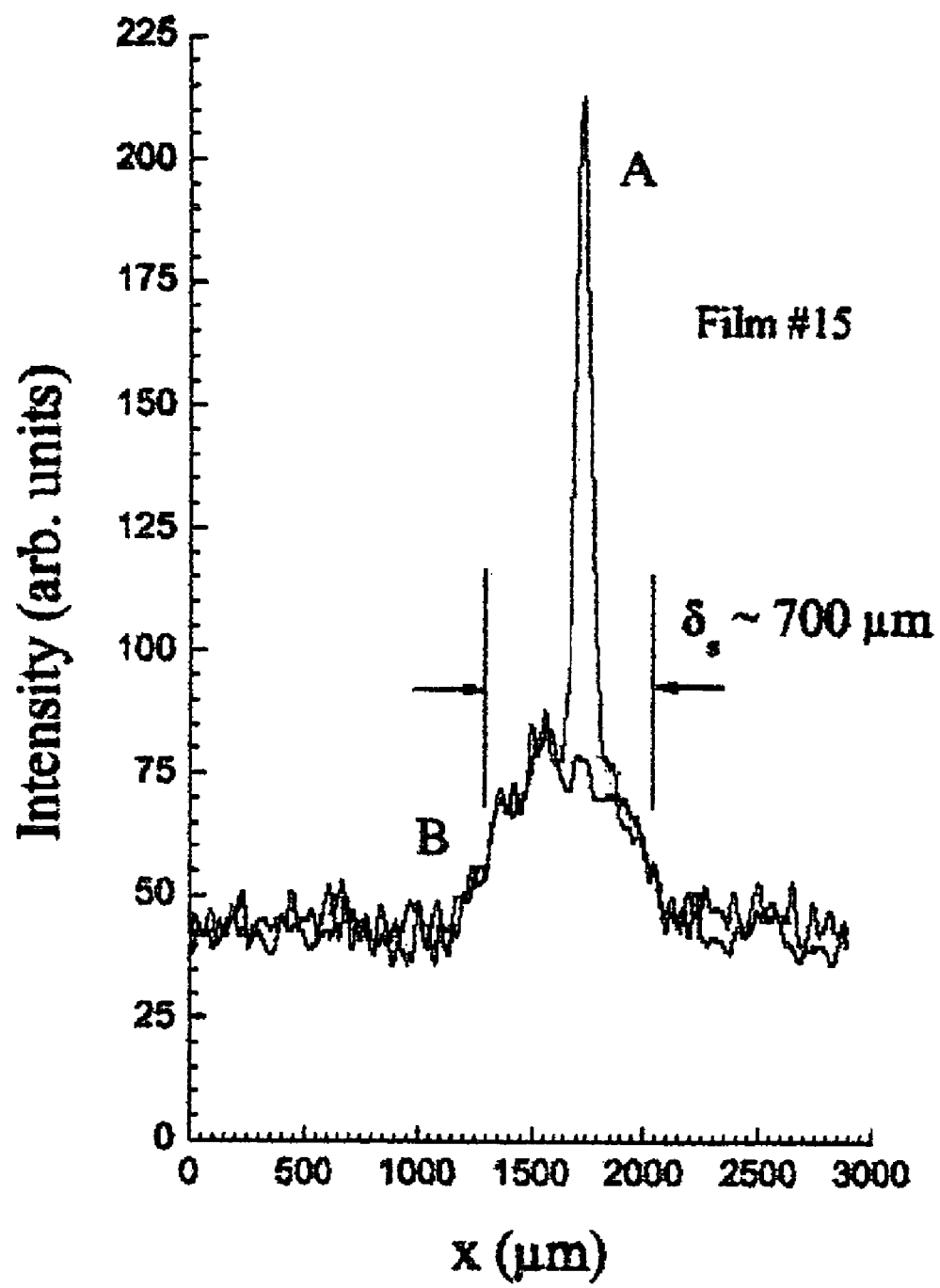

FIG. 6b shows the detail of the exposure recorded on film #15 which gives rise to the spectrum shown in FIG. 6a. The morphology of the isolated $Xe^{32+}$ feature indicates that the exposure corresponding to the observed enhancement was generated on a single pulse. This interpretation is confirmed by data presented in FIG. 14 below. Spectral positions A and B designate the locations of the transverse (spatial) sections of the spectrum shown in FIG. 6c which shows the superposition of transverse sections A and B indicated in FIG. 6b. Section A corresponds to the wavelength of the enhanced $Xe^{32+}$ feature in FIG. 6a. Section B gives the width is $\delta_s$ of the exposure from the isotropic source. The spatial position of the amplified $Xe^{32+}$ line falls well within the region defined by the width $\delta_s$ of the observed isotropic emission.

In the case involving the Ti foil shielding the spectrograph, a canonical spatial mode pattern consisting of a regular circular array of holes pierced in the foil having an individual feature size of ~1 $\mu$m and an overall diameter of ~5 $\mu$m was recorded. This observation: (a) indicates a divergence of $\delta\theta_x \cong 0.2$ mr, a value approximately twice that expected from a coherent aperture formed by a channel with a diameter of 2–3 $\mu$m that radiates at a wavelength ~2.9 Å; and (b) demonstrates the spatial coherence of the amplified x-rays. The detection of the amplified beam with the film packs at a distance of ~12.5 cm from the source confirms the divergence of $\delta\theta_x \cong 0.2$ mr. In this case, since the damage to the Ti foil is not fully penetrating, the morphology of the physical damage produced on the Ti surface is matched by the shape of the exposure of the transmitted x-rays on the film located directly behind it. Further, the observed damage to the Ti foils is consistent with both the estimated saturation flux of ~10 J/cm² for the Xe(L) transitions and the observation of the spectral hole-burning. Electrons accelerated by a laser wakefield in the forward direction can be ruled out as the source of the damage to the Ti foils on several experimental grounds [See, e.g., A. McPherson et al., Competition between Multiphoton Cluster Excitation and Plasma Wave Raman Scattering at 248 nm," *J. Phys. B* 29, L291 (1996), R. Wagner et al., "Electron Acceleration by a Laser Wakefield in a Relativistically Self-Guided Channel," *Phys. Rev. Lett.* 78, 3125 (1997), and Xiaofang Wang et al., "Electron Acceleration and the Propagation of Ultrashort High-Intensity Laser Pulses in Plasmas," *Phys. Rev. Lett.* 84, 5324 (2000).]. This conclusion is confirmed by the inability of accelerated electrons to mimic quantitatively the multilobed spatial mode pattern observed in the Ti foil with a minimum feature size ~1 μm and propagate uniformly with a small divergence (0.2 mr) over an extended path length of 12.5 cm. Spectral narrowing of the overall Xe(L) hollow atom spontaneous emission spectrum is consistently a conspicuous observation only in the axially recorded spectra. For example, the spectral width of the single enhanced feature shown in FIG. 6*a* is $\delta_{32}$~4 eV; the corresponding width of the full Xe(L) hollow atom spectral profile [See, e.g. A. McPherson et al., "Multiphoton-Induced X-Ray Emission at 4–5 keV from Xe Atoms with Multiple Core Vacancies," *Nature* 370, 631 (1994), K. Kondo et al., "Wavelength Dependence of Multiphoton-Induced Xe(M) and Xe(L) Emissions from Xe Clusters," *J. Phys.* B 30, 2707 (1997), and A. B. Borisov et al., "Z-λ Imaging of Xe(M) and Xe(L) Emissions from Channeled Propagation of Intense Femtosecond 248 nm Pulses in a Xe Cluster Target," *J. Phys.* B 29, L113 (1996).] shown in FIG. 1 is $\delta_o$~200 eV for either emission lobe.

Figure 7:
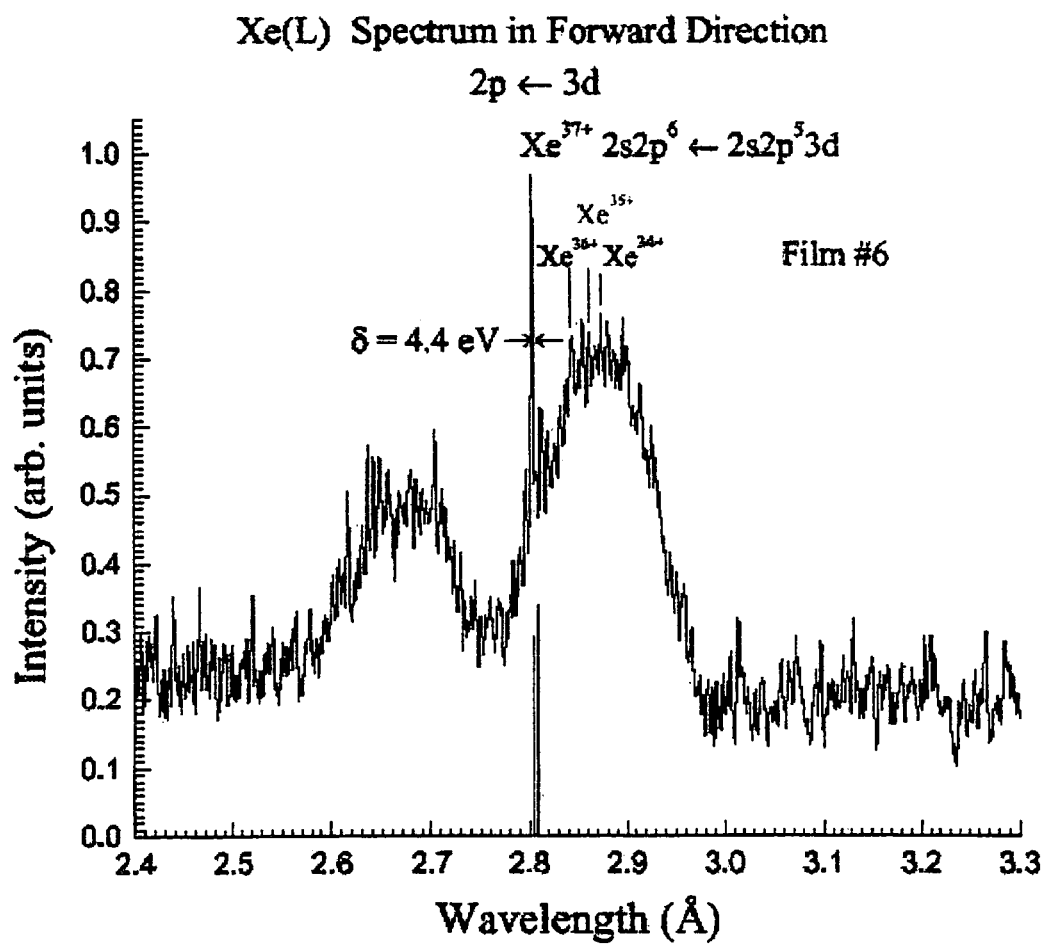
FIG. 7 shows a narrow enhanced feature at λ~2.80 Å observed in the forward (axial) direction is shown with a measured width (FWHM) of ~4.4 eV.

C. Double-Vacancy Production:

Studies [See, e.g., A. McPherson et al., "Multiphoton-Induced X-Ray Emission at 4–5 keV from Xe Atoms with Multiple Core Vacancies," *Nature* 370, 631 (1994), K. Kondo et al., "Wavelength Dependence of Multiphoton-Induced Xe(M) and Xe(L) Emissions from Xe Clusters," *J. Phys.* B 30, 2707 (1997), and A. B. Borisov et al., "Intensity Dependence of the Multiphoton-Induced Xe(L) Spectrum Produced by Subpicosecond 248 nm Excitation of Xe Clusters," *J. Phys.* B 29, L43 (1996).] of the Xe(L) emission produced from Xe clusters have revealed the presence of double-vacancy states, an observation that agrees with theoretical analyses [See, e.g., A. B. Borisov et al., "Intensity Dependence of the Multiphoton-Induced Xe(L) Spectrum Produced by Subpicosecond 248 nm Excitation of Xe Clusters," *J. Phys. B* 29, L43 (1996), W. A. Schroeder et al., "An Efficient, Selective Collisional Ejection Mechanism for Inner-Shell Population Inversion in Laser-Driven Plasmas," *J. Phys.* B 34, 297 (2001) and K. Boyer and C. K. Rhodes, "Superstrong Coherent Multi-Electron Intense-Field Interaction," *J. Phys.* B 27, L633 (1994).] that predict their production with high probability. Accordingly, analysis [See, e.g., A. McPherson et al., "Multiphoton-Induced X-Ray Emission at 4–5 keV from Xe Atoms with Multiple Core Vacancies," *Nature* 370, 631 (1994) and R. D. Cowan, *The Theory of Atomic Structure and Spectra* (University of California Press, Berkeley, Calif., 1982).] of the enhanced feature in the axial spectrum shown in FIG. 7 hereof identifies it as a double-hole $Xe^{37+}$ transition of the form $(2s)(2p)^5 3d \rightarrow (2s)(2p)^6$. FIG. 7 shows a narrow enhanced feature at λ~2.80 Å observed in the forward (axial) direction is shown with a measured width (FWHM) of ~4.4 eV. The computed [See.e.g., R. D. Cowan, *The Theory of Atomic Structure and Spectra* (University of California Press, Berkeley, Calif., 1982).] transitions are the two j=½←j=½ lines in the double vacancy $Xe^{37+}$ array, lines favored for amplification on the basis of their high spectral density.

From a comparison of the strength of the feature with other observed transitions, the spectrum indicates that the single-vacancy and double-vacancy excitation rates may differ by approximately a factor of two. Given the measured intensity dependence of the double-hole excitations [See, e.g., A. B. Borisov et al., "Intensity Dependence of the Multiphoton-Induced Xe(L) Spectrum Produced by Subpicosecond 248 nm Excitation of Xe Clusters," *J. Phys.* B 29, L43 (1996).], which exhibits a sharp increase above an intensity of $\sim 8 \times 10^{18}$ W/cm², it is possible that double-vacancy states are the dominant excitations in the central core of the channel. The measured width of ~4.4 eV, a value corresponding closely to the spectral resolution of the von Ha mos spectrometer, suggests the involvement of a transition array with a relatively low multiplicity. The two closely spaced lines identified have that expected property. The presence of double-hole excitations confirms the atom-specific power density of ~1 W/atom [See, e.g., A. B. Borisov et al., "Z-λ Imaging of Xe(M) and Xe(L) Emissions from Channeled Propagation of Intense Femtosecond 248 nm Pulses in a Xe Cluster Target," *J. Phys.* B 29, L113 (1996), A. B. Borisov et al., "Intensity Dependence of the Multiphoton-Induced Xe(L) Spectrum Produced by Subpicosecond 248 nm Excitation of Xe Clusters," *J. Phys.* B 29, L43 (1996), A. McPherson et al., "Evidence of Enhanced Multiphoton (248 nm) Coupling from Single-Pulse Energy Measurements of Xe(L) Emission Induced from Xe Clusters," *J. Phys.* B 30, L767 (1997), and K. Boyer and C. K. Rhodes, "Superstrong Coherent Multi-Electron Intense-Field Interaction," *J. Phys.* B 27, L633 (1994).] estimated from previous work, as a value sufficient to reach wavelengths in the region of ~1 Å.

Figure 8A:
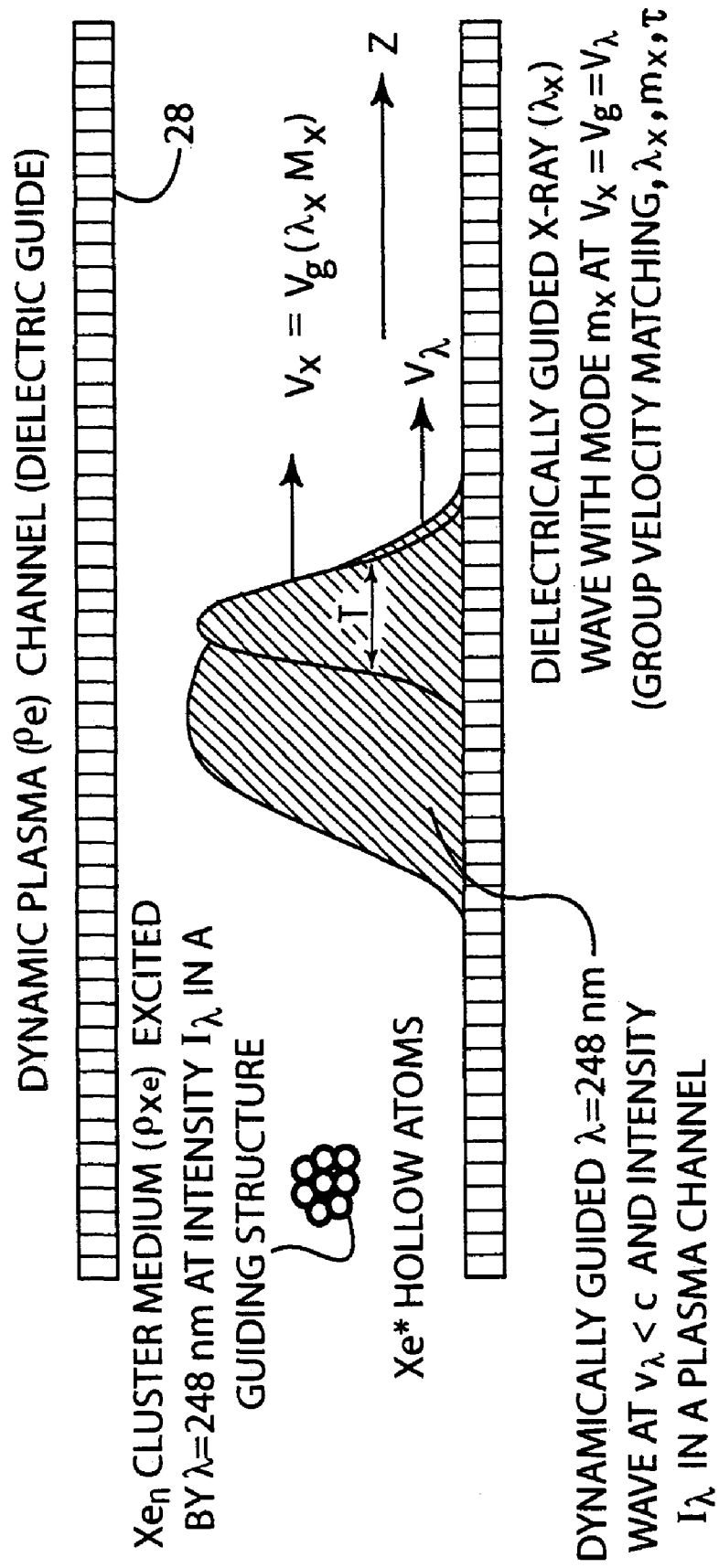
FIG. 8a is a schematic representation of the x-ray amplifier concept of the present invention showing matching of the group velocity, $v_g$, of the driving 248 nm wave with that for the x-ray signal at wavelength $\lambda_x$, while FIG. 8b identifies the physical parameters which interact to produce the dispersive conditions necessary to achieve the amplification process and which must be adjusted to achieve tuning within a particular charge-state array.
Figure 8B:
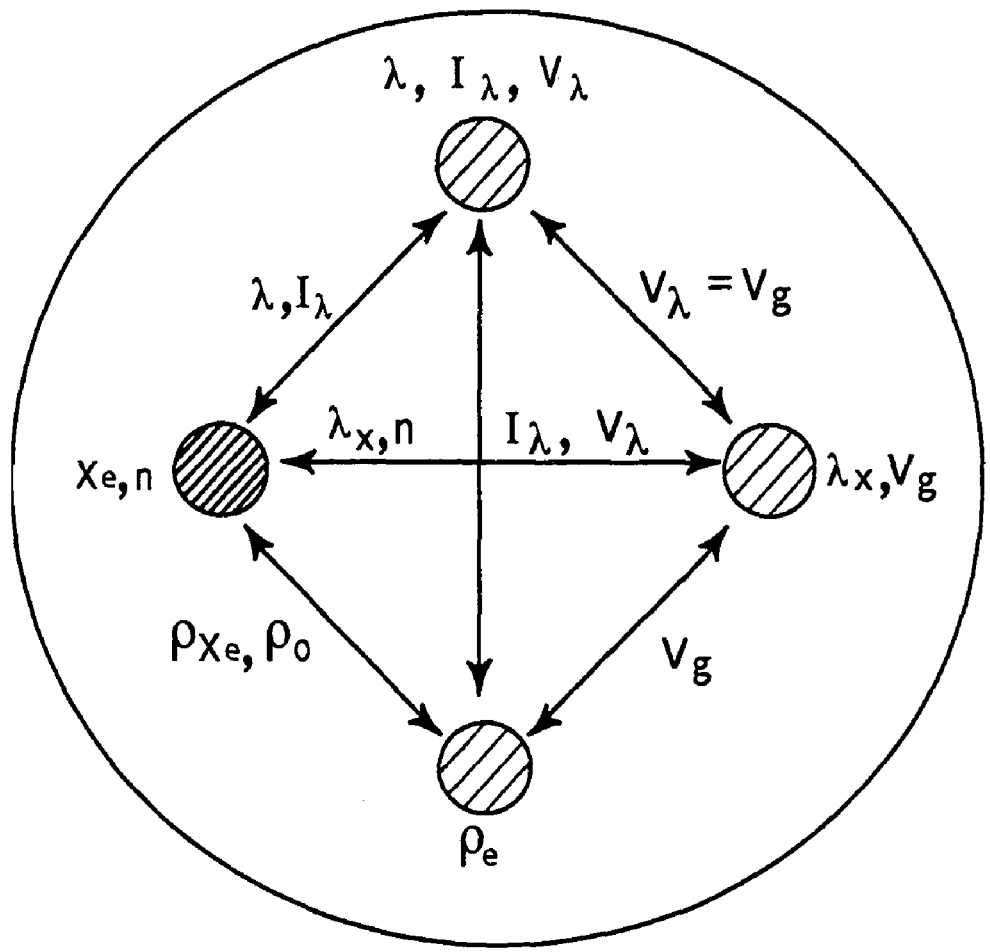

D. X-Ray Spatial Mode Formation:

The ability of the plasma channel to guide the x-rays [See, e.g., Johndale C. Solem et al., "Prospects for X-Ray Amplification with Charge-Displacement Self-Channeling," *IEEE J. Quantum Electron.* QE-25, 2423 (1989).] is of dynamical importance. Analysis of the angular dependence of the spectrum emitted from the channel indicated that the amplification is governed by the group velocity matching of the 248 nm and x-ray waves in the plasma channel which can function as a dielectric guide [See, e.g., Allan W. Snyder and John D. Love, *Optical Waveguide Theory* (Chapman and Hall, London/New York, 1983).] for both wavelengths. Since the excited state lifetime for 3d→2p transitions is short (~1–2 fs), the velocity matching is necessary for the amplification to develop along an appreciable length (~2 mm). A schematic of this velocity matching condition, along with an identification of the set of physical parameters associated with its control, is shown in FIG. 8, where FIG. 8*a* is a schematic representation of the x-ray amplifier concept of the present invention showing matching of the group velocity, $v_g$, of the driving 248 nm wave with that for the x-ray signal at wavelength $\lambda_x$. The dynamics of the channel formation cause the formation of a very steep leading edge on the propagating 248 nm pulse with a rise-time estimated to be ~3 fs. In order to achieve the desired condition, in which the transient inverted excited state density can propagate synchronously with the x-ray signal undergoing amplification, the x-rays form mode mx such that $v_\lambda = v_x = v_g$. FIG. 8*b* shows the physical parameters which interact to produce the dispersive conditions which give rise to amplification, the simultaneous control of which parameters leading to a chosen x-ray frequency for a given charge-state array. The estimated x-ray pulse length of $\tau \approx 2$–3 fs is allows maintenance of a synchronism comparable to the radiative lifetime of the Xe(L) transitions. The electron density is given by $\rho_e$ and c denotes the speed of light. Gross wavelength changes (100 s of eV) are made by changing the atoms in the clusters, while the tunability over the wavelengths accessible to a particular hollow atom array (eVs) is achieved by controlling the electron density of the plasma, the pulsewidth, intensity and wavelength of the laser, and the density of the clusters as independent parameters. The density of clusters can be controlled by varying the pressure and the temperature of the gas behind the expansion nozzle. Other atoms suitable for cluster formation in accordance with the present invention include Ar, Kr, Au, Bi, Th, Pb, Hg, I, and U, and mixtures thereof. Atom clusters can be formed using clusters of molecules containing the desired atoms. For example, $UF_6$ and $I_2$ permit cluster formation involving uranium and iodine.

Physically, the correct group velocity vg is achieved for the 2.9 Å x-rays through the formation of the appropriate spatial mode. However, this generally cannot be a free space mode, since the velocity matching condition ($v_x=v_\lambda$), governed by the velocity of propagation $v_\lambda$ of the 248 nm excitation pulse, perforce involves a value slightly less than the speed of light c. Moreover, since the refractive indices at the x-ray wavelength are small, the x-ray guiding condition is fragile and quite sensitive to the experimental conditions, in contrast to the robust guiding of the 248 nm wave, since the plasma frequency is far closer to critical in the ultraviolet case. Furthermore, this condition is transition (wavelength)-dependent, since each x-ray line has a different anomalous dispersion which, through interaction with the dispersive character of the plasma channel, forms the structure of a cladded guide which selectively supports the propagation of the required x-ray mode. Hence, the amplification is tunable, a property that will be discussed in more detail hereinbelow. Experimental control is important, since the states involved, both plasma and atomic, are highly ordered [See, e.g. G. Marowsky and Ch. K. Rhodes, "Hohle Atome-Eine Neue Form von Hochangeregter Materie," Neue Zürcher Zeitung, Nr. 254, 1. November 1995, S. 42.] and tightly coupled.

Additionally, the peaks shown in FIG. 5a and FIG. 6a, which respectively possess corresponding narrow spectral widths $\delta_{34}$ and $\delta_{32}$ produced by a single pulse, can be accounted for by the fact that the conditions for x-ray guiding and the geometrically sensitive Bragg condition for the detection of the amplified spatially directed signal by the von Hámos spectrograph are infrequently jointly satisfied, although the 248 nm channels are readily formed. The isotropic background Xe(L) hollow atom spontaneous emission is largely insensitive to fluctuating experimental conditions and is copiously generated and detected over a large solid angle on every pulse with the outcome that the contrast of the spectrum is considerably reduced.

Figure 9A:
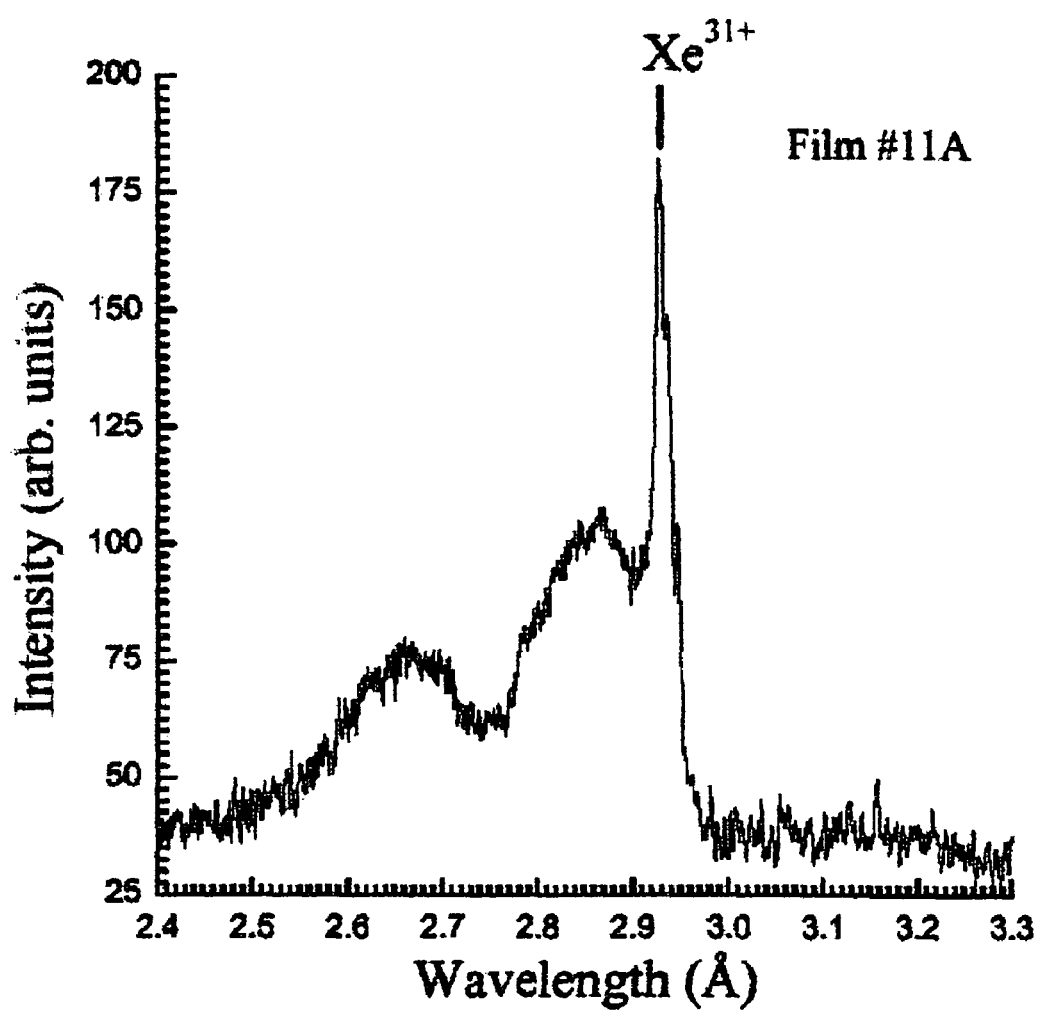
FIG. 9a illustrates the strong enhancement observed in the forward directed $Xe^{31+}$ array with channel formation, an outcome attributed to satisfaction of the group velocity matching condition $v_\lambda = v_x = v_g$ for these lines.
Figure 9B:
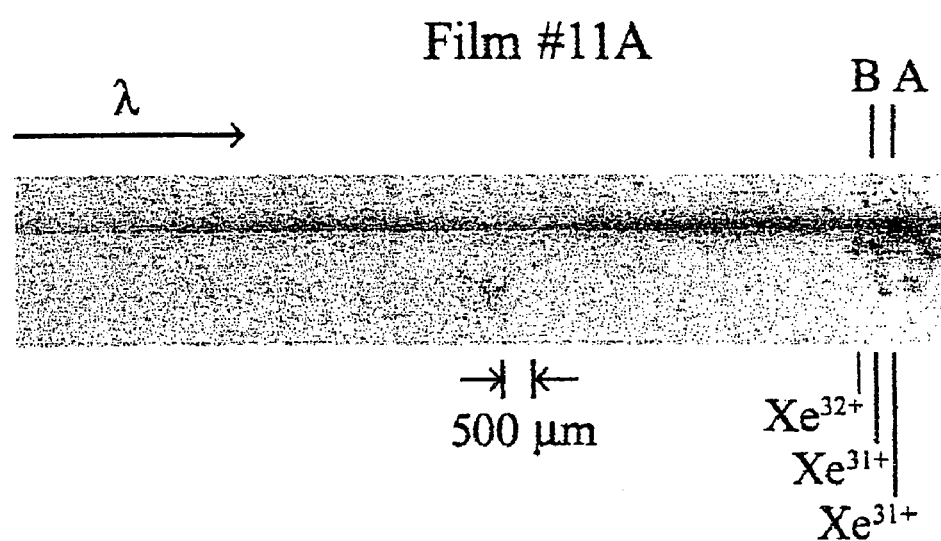
FIG. 9b shows the details of film #11A that gives rise to the spectrum shown in FIG. 9a, and FIG. 9c shows the transverse lineouts A and B of the exposure shown in FIG. 9b at wavelengths corresponding respectively to the transitions at 2.93 Å and 2.92 Å attributed to the $Xe^{31+}$ array.
Figure 9C:
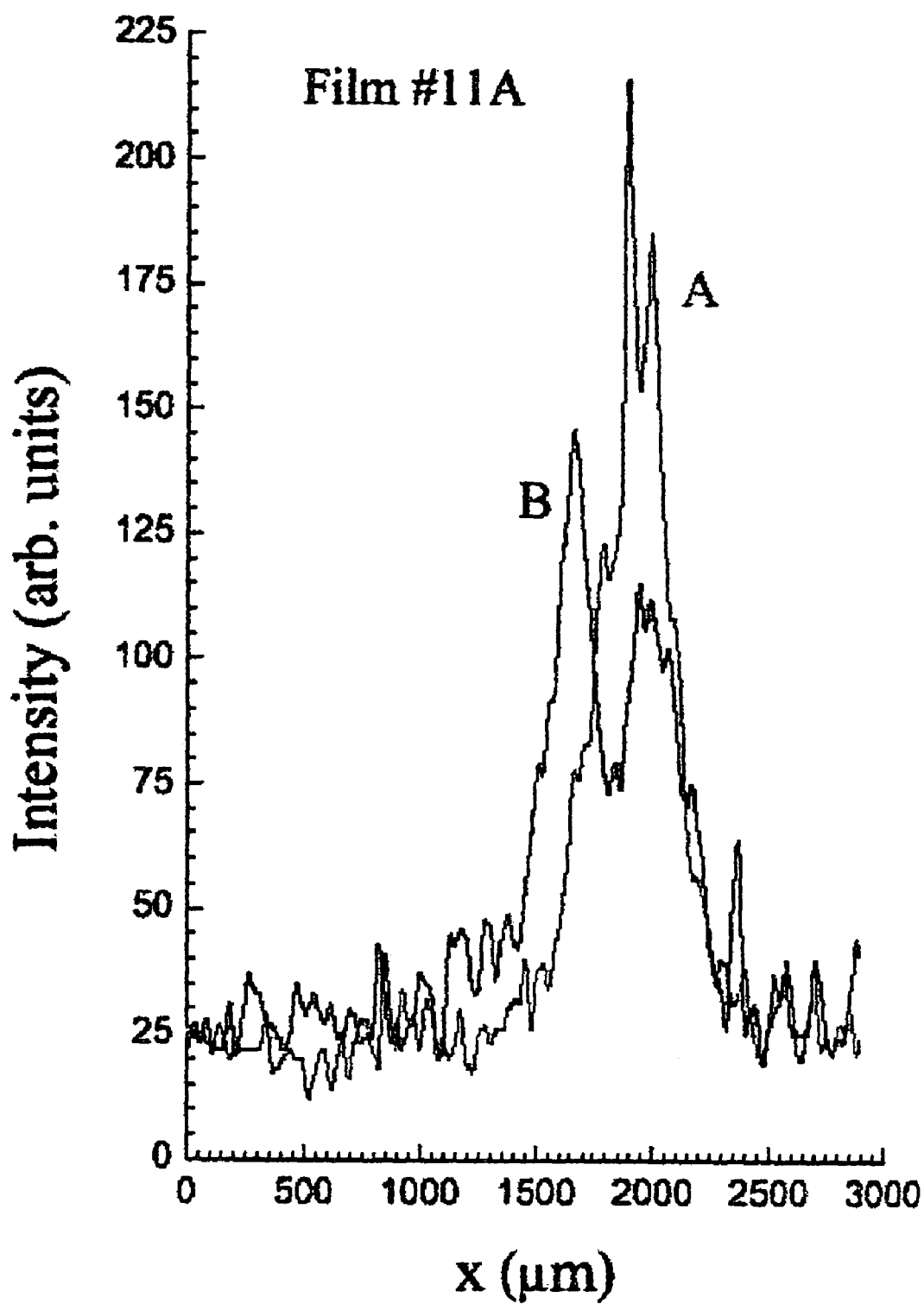

E. Wavelength Tunability:

The spectral results presented in FIG. 5, FIG. 6, and FIG. 9 demonstrate the property of tunability of the amplified x-ray emission in the 2.71–2.93 Å range. The forward directed spectrum illustrated in FIG. 9 shows a strong enhancement of lines in the $Xe^{31+}$ array at λ~2.93 Å with channel formation, an outcome attributed to satisfaction of the group velocity matching condition $v_\lambda=v_x=v_g$ for these lines. These transitions occur in the wing of the corresponding unamplified spontaneous emission profile pictured in FIG. 1. FIG. 9b shows the details of film #11A that gives rise to the spectrum shown in FIG. 9a. In addition to the strong $Xe^{31+}$ feature, which appears on the central axis of exposure, weaker laterally displaced exposures corresponding to the spectral positions of the other lines in the $Xe^{31+}$ and $Xe^{32+}$ transition arrays are seen. The morphologies of these exposures are again consistent with generation by single pulses from channels whose geometrical alignments and directionalities, with respect to the axis of the von Hámos spectrograph, fluctuate. The transverse lineouts, whose spectral positions are designated by A and B and are shown in FIG. 9c, indicate the consistency of the laterally displaced $Xe^{31+}$ feature (B) with the imaging characteristics of the von Hámos spectrograph shown in FIG. 2 hereof. Transverse lineouts A and B of the exposure shown in FIG. 9b at the wavelengths corresponding respectively to the transitions at 2.93 Å and 2.92 Å are attributed to the $Xe^{31+}$ array. The lateral positions of both components are consistent with the imaging characteristics of the von Hámos spectrograph and the experimental uncertainties in alignment.

The strongly enhanced $Xe^{32+}$ feature shown in FIG. 6a at 2.71 Å is also considerably removed from the peak of the corresponding spontaneous emission spectrum. This conventionally unexpected behavior can occur, since the tuning of the group velocity condition plays a role favoring these lines that is analogous to the introduction of an etalon in the cavity of a dye laser; appreciable amplification can only be achieved over a limited and controllable spectral range. Comparison of the features shown in FIG. 5a, FIG. 6a, and FIG. 9a, as presented jointly in FIG. 10, demonstrates a tunability from ~2.71 Å to ~2.93 Å. The corresponding shift in quantum energy is $\Delta\hbar\omega_x$~345 eV. The intensity scales are in arbitrary units so that the ordinate values corresponding to the three spectra are not quantitatively related. A consequence of the development of an x-ray mode is the high degree of spatial coherence on the x-ray output which is confirmed by the observation of the spatial mode pattern discussed hereinbelow.

Figure 10:
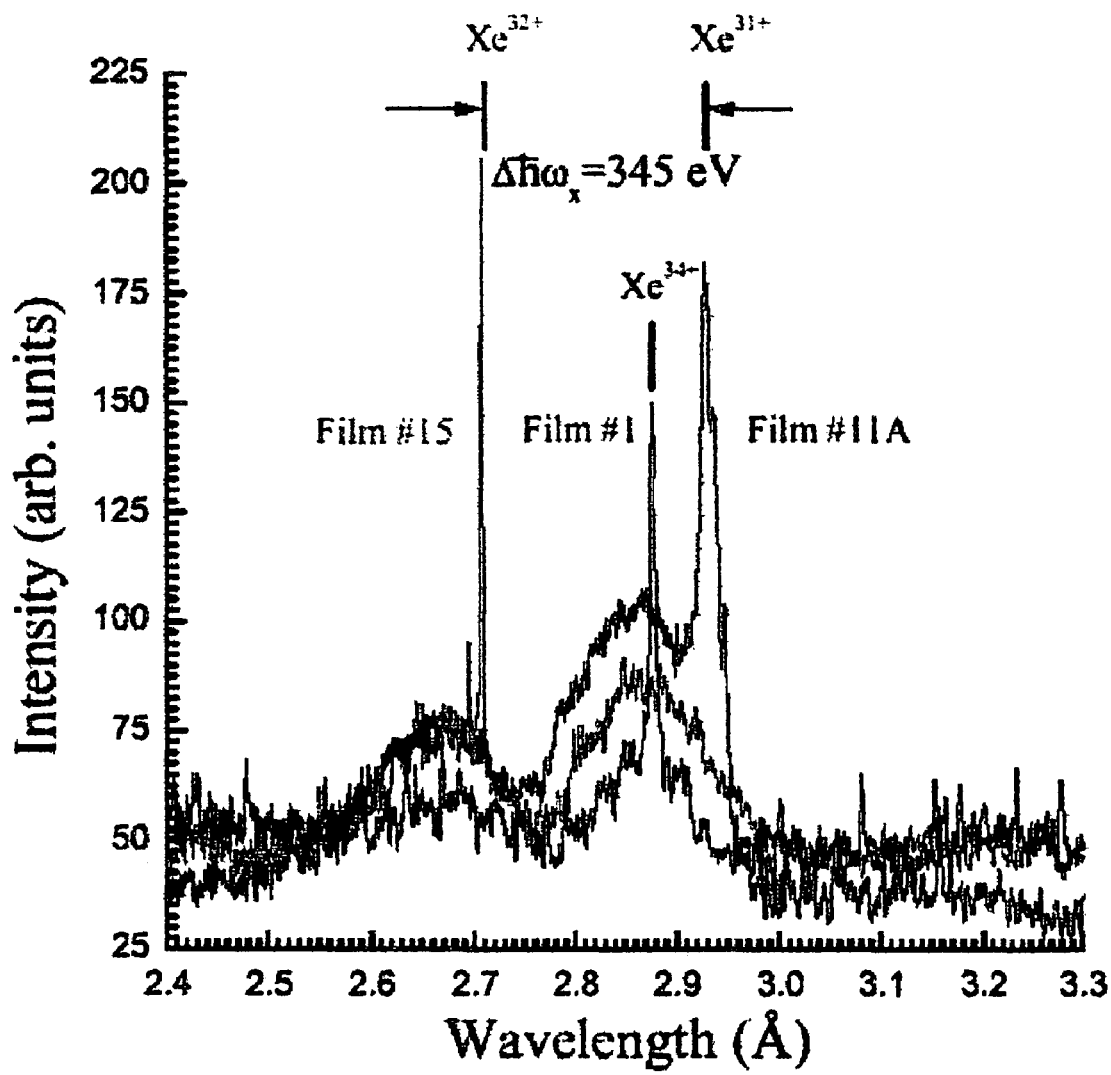
FIG. 10 shows spectra from films #1, #11A, and #15 and demonstrates tunability from 2.71–2.93 Å.

One feature of the spectral comparisons shown in FIG. 10 is the prominence of the $Xe^{31+}$ (2.93 Å) and $Xe^{32+}$ (2.71 Å) transitions, both of which, in contrast to the $Xe^{34+}$ line, fall at wavelengths significantly removed from their corresponding spontaneous emission maxima. This observation has a natural spectroscopic basis in that the $Xe^{31+}$ and $Xe^{32+}$ charge-state arrays possess the maximum multiplicity of spectral components (thousands), and have a good chance of fulfilling the dispersive condition for the formation of a spatial mode with the correct group velocity match. The high state multiplicity resulting from the half-filled 3d-shell enables the system to attain a proper (dispersive) fit.

F. Estimates of Gain Constant:

The spectral data enable the exponential gain parameter $g_o$l, composed of the small signal gain constant $g_o$ and the length, l, to be estimated with two independent methods, specifically, one (a) based on the amplification factors deduced from the observed spectra and the other (b) derived from the measured magnitude of the spectral line narrowing [See, e.g., A. E. Siegman, Lasers (University Science Books, Mill Valley, Calif., 1986) p.282.]. It is important to recognize that the dispersive influence on the amplification outlined in FIG. 8 causes the conventional concept of the gain constant $g_o$ to be strictly valid only in the limit of perfect group velocity matching, a condition that we assume for the following estimates. Therefore, by applying the former approach, with the respective spectrally indicated amplifications of ~$10^6$ and ~$6\times10^6$ for the $Xe^{34+}$ and $Xe^{32+}$ lines shown in FIG. 5a and FIG. 6a and the assumption of an effective lenght, λ, in the range between 1.5 and 2.5 mm, a value of $55 \leq g_o \leq 92$ cm$^{-1}$ is obtained for the $Xe^{34+}$ transition (film #1) and $62 \leq g_o$ 104 cm$^{-1}$ for the $Xe^{32+}$ line (film #15). Both results overlap the theoretically estimated value of 60±20 cm$^{-1}$ that was based on measured properties of the Xe(L) system derived from earlier studies [See, e.g. A. McPherson et al., "Multiphoton-Induced X-Ray Emission at 4–5 keV from Xe Atoms with Multiple Core Vacancies," Nature 370, 631 (1994), K. Kondo et al., "Wavelength Dependence of Multiphoton-Induced Xe(M) and Xe(L) Emissions from Xe Clusters," J. Phys. B 30, 2707 (1997), A.

B. Borisov et al., "Z-λ Imaging of Xe(M) and Xe(L) Emissions from Channeled Propagation of Intense Femtosecond 248 nm Pulses in a Xe Cluster Target," *J. Phys.* B 29, L113 (1996), A. B. Borisov et al., "Intensity Dependence of the Multiphoton-Induced Xe(L) Spectrum Produced by Subpicosecond 248 nm Excitation of Xe Clusters," *J. Phys.* B 29, L43 (1996), A. McPherson et al., "Evidence of Enhanced Multiphoton (248 nm) Coupling from Single-Pulse Energy Measurements of Xe(L) Emission Induced from Xe Clusters," *J. Phys.* B 30, L767 (1997), W. Andreas Schroeder et al., "Pump Laser Wavelength-Dependent Control of the Efficiency of Kilovolt X-Ray Emission from Atomic Clusters," *J. Phys.* B 31, 5031 (1998), and W. A. Schroeder et al., "An Efficient, Selective Collisional Ejection Mechanism for Inner-Shell Population Inversion in Laser-Driven Plasmas," *J. Phys.* B 34, 297 (2001).]. Moreover, these estimates are robust; a reduction of the amplification factors estimated from the data shown in FIG. 5a and FIG. 6a by a factor of $10^2$ does not eliminate agreement between the theoretically predicted and experimentally observed ranges for the gain constant $g_o$.

Figure 11:
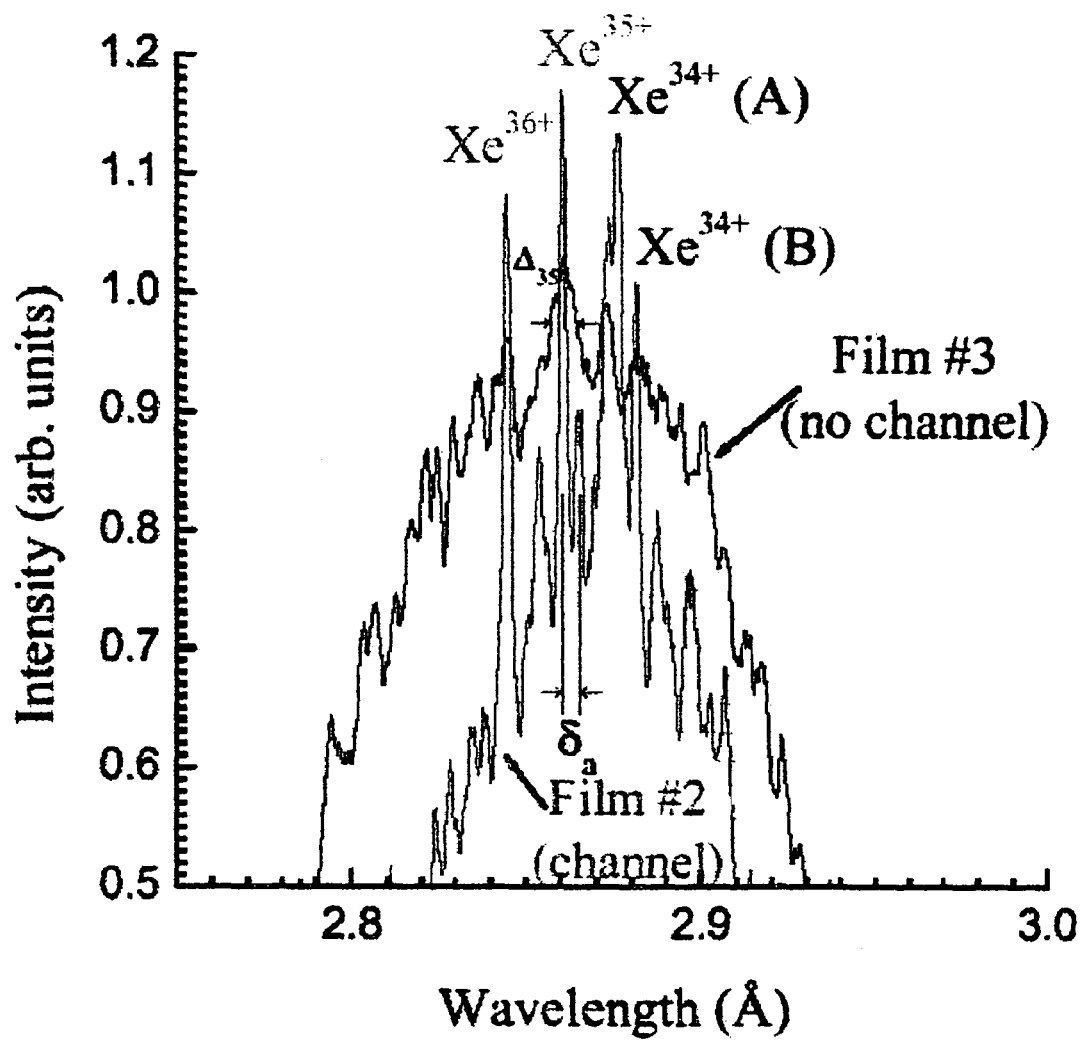
FIG. 11 shows the comparative widths (FWHM) of the respective components which exhibit spectral line narrowing.

An evaluation of the amplification with the observed spectral narrowing involves treatment of the spontaneous width $\Delta_q$ presented by a $Xe^{q+}$ charge state array as arising from an inhomogeneously broadened ensemble of radiating states. Since the instrumental width of the von Hámos spectrograph is ~4.0 eV, a good case for the application of this method is the $Xe^{35+}$ transition array which possesses a measured spontaneous width $\Delta_{35} \cong 11.0$ eV, shown exhibited by film #3 in both FIG. 1 and FIG. 11, and a narrowed width $\delta_{35} \cong 4.5$ eV on the corresponding enhanced line observed in the forward (axial) direction on film #2, also shown in FIG. 11. FIG. 11 shows the comparative widths (FWHM) of the respective components which exhibit spectral line narrowing. The width of the $Xe^{35+}$ component in the transversely measured spontaneous spectrum shown in FIG. (1) (film #3) is $\Delta_{35} \cong 11$ eV. The corresponding amplified feature obtained with other spectral data recorded axially from the channel (film #2) displays a considerably narrowed width of $\delta_{35} \cong 4.5$ eV. Components A and B of the $Xe^{34+}$ array, also observed with a significant enhancement in these data, respectively exhibit a definitive spectral shift favoring the red wing and a manifest narrowing. The spectral splitting between two features attributed to the $Xe^{35+}$ array is denoted by $\delta_a \cong 7$ eV. The $Xe^{36+}$ transition, although enhanced, displays no spectral narrowing.

With $\delta_{35}/\Delta_{35} \cong 0.41$ and the assumption of a Gaussian spectral density, the theoretical analysis [See, e.g., A. E. Siegman, *Lasers* (University Science Books, Mill Valley, Calif., 1986) p.282.] yields the estimated value $g_o l \cong 6.7$. Consequently, with l between about 1.5 and 2.5 mm, as indicated in the description for FIG. 2 hereinabove, a value of $27 \leq g_o \leq 45$ cm$^{-1}$ is obtained. This magnitude overlaps the theoretically expected region of 60±20 cm$^{-1}$. However, since the narrowed width of $\delta_{35}$~4.5 eV is close to the estimated instrumental resolution (~4.0 eV), this determination of $g_o l$ is interpreted as a lower bound.

Figure 12:
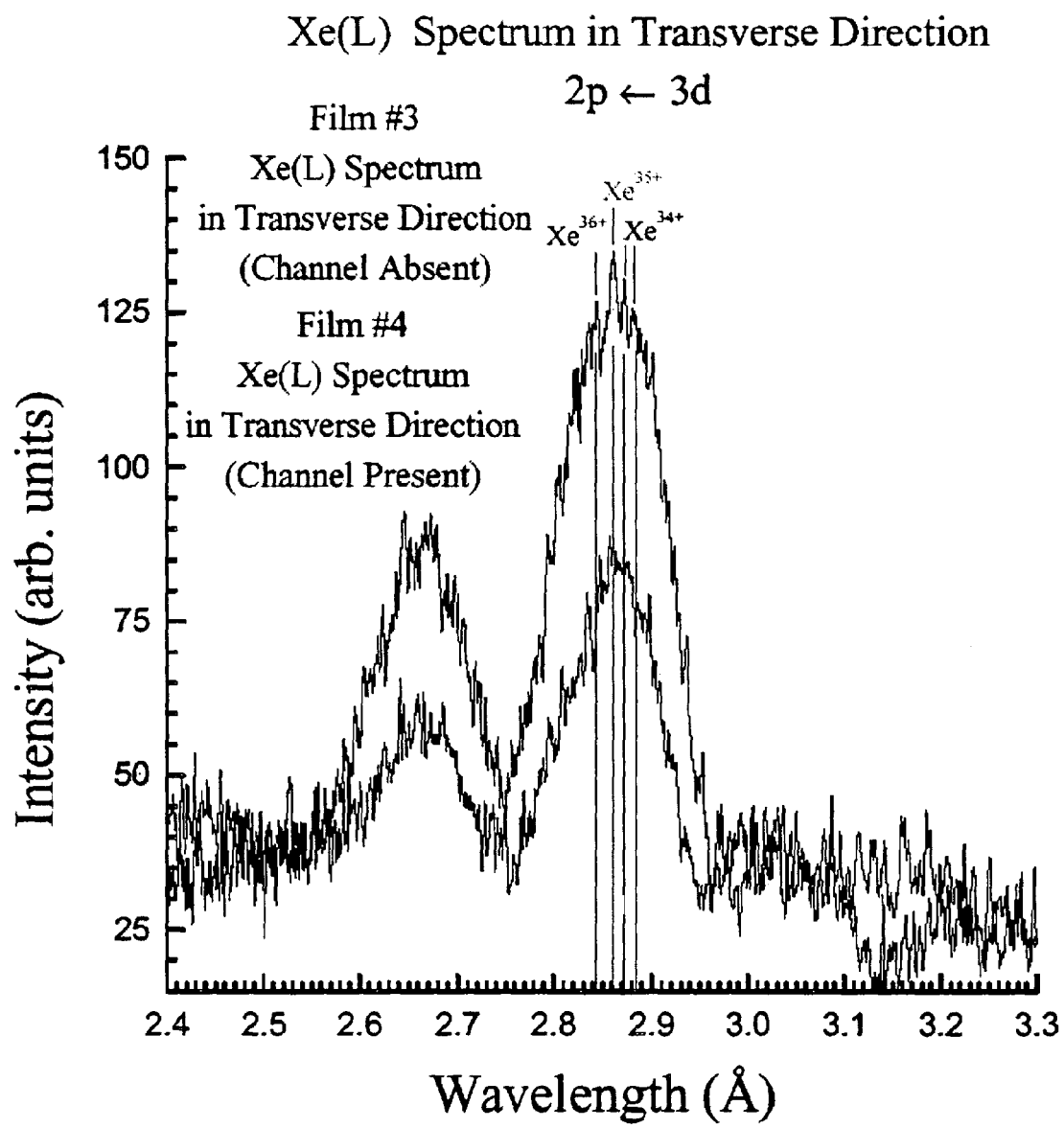

Comparing the spectral narrowing of the $Xe^{35+}$ array with the comparably amplified $Xe^{36+}$ feature illustrated in FIG. 12 by film #2, it is observed that in contrast to the $Xe^{35+}$ transition, the strongly enhanced $Xe^{36+}$ line in film #2 exhibits no narrowing of its width in comparison with the corresponding $Xe^{36+}$ feature visible in the spontaneous unamplified spectrum (film #3). Both lines possess the same width of ~4.0 eV, the value that corresponds to the instrumental limit. Since the electron configuration of $Xe^{36+}$ is Ar-like, and consequently it is an array that consists of a single transition having a natural width (~1 eV), it cannot be experimentally resolved. Hence, the absence of spectral narrowing on the $Xe^{36+}$ transition, although it is strongly enhanced, confirms the validity of the spectral narrowing observed for the $Xe^{35+}$ component.

Figure 12B:
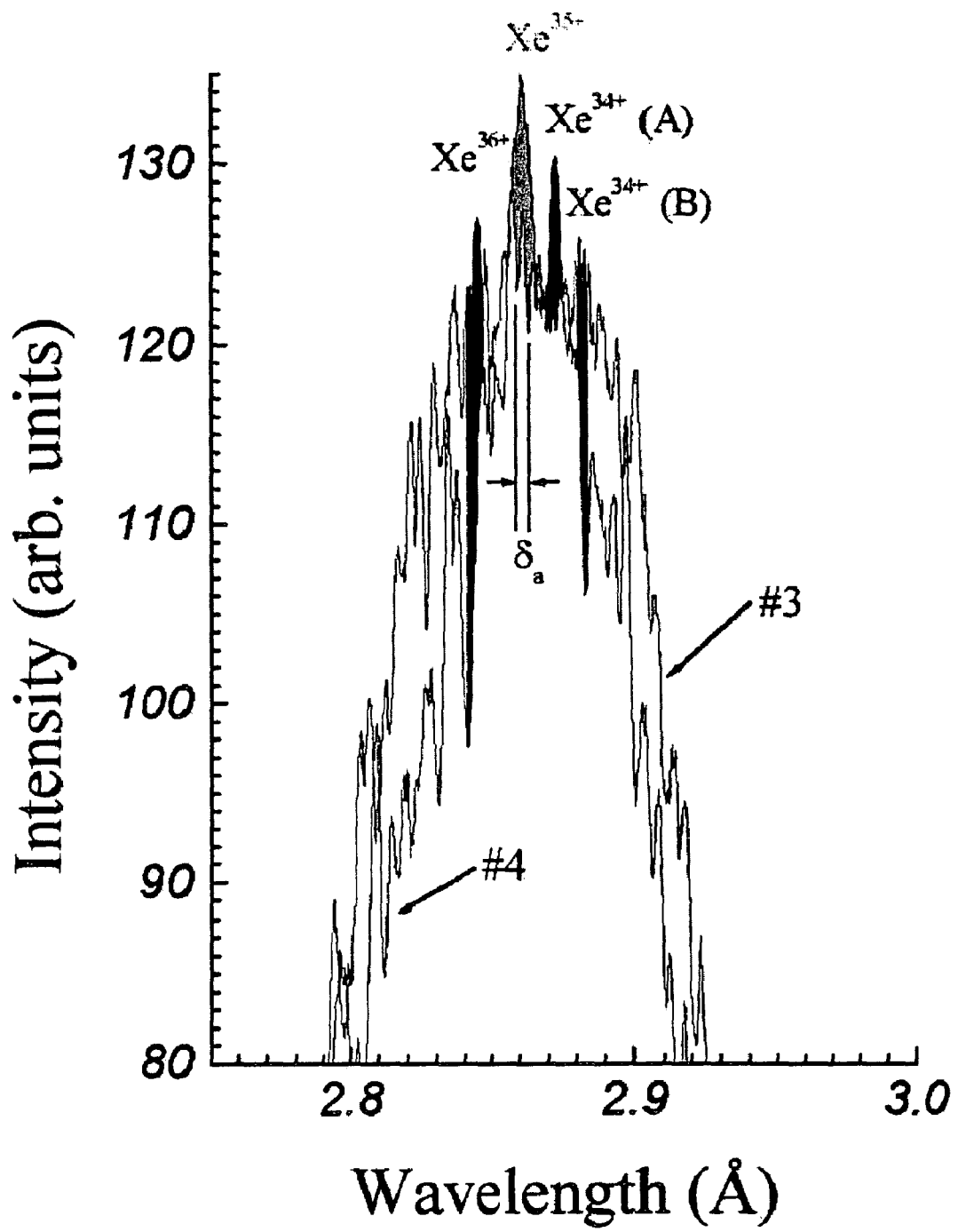
FIG. 12b shows a comparison of films #3 and #4 that details the spectral reorganization from spectral hole-burning.

G. Spectral Hole-Burning:

Evidence for spectral hole-burning, a manifest indication of saturated amplification, has been found from an examination of emission spectra recorded transverse to the axis of the channel. The spectral details of the hole-burning correlate well with the corresponding enhanced features of the $Xe^{34+}$, $Xe^{35+}$, and $Xe^{36+}$ arrays observed in the axial direction shown, for example, on film #2 in FIG. 11. Specifically, the direct comparison of two transverse spectra (film #3, without channels, versus film #4, with channels) is presented in FIG. 12a; FIG. 12b highlights the detailed structure of the relative spectral difference. FIG. 12a shows the spectral comparison of transversely emitted spontaneous emission with (film #4) and without (film #3) channel formation which illustrates spectral hole-burning. The features corresponding to the $Xe^{36+}$, $Xe^{35+}$, and $Xe^{34+}$ (A and B) transitions visible in the emission without channel formation, whose computed positions are indicated by color coded bars, are suppressed or converted into corresponding dips (reversed) in the emission observed with channel formation. The spectral intensity is in arbitrary units; the respective exposures for films #3 and #4 were 1400 and 600 pulses. The spectrum for film #4 corresponds to the image of the spatial region near the exit of the channel, the zone in which the amplified waves would be maximally intense. FIG. 12b is a comparison of films #3 and #4 detailing the spectral reorganization from spectral hole-burning. Using appropriately vertically shifted spectra, the color-shaded regions illustrate the transverse emission that are missing when channels are present. The spectral shift between the two dips associated with the $Xe^{35+}$ array, which matches the splitting of the enhanced transitions identified in FIG. 11, is denoted by $\delta_a \cong 7$ eV.

For the $Xe^{36+}$ feature, it is evident that the plainly visible peak present in spectrum #3 is converted into the strong dip appearing in spectrum #4. Hence, the $Xe^{36+}$ line becomes sharply reversed in the transverse direction while it is enhanced along the axis of the channel, as shown with film #2 in FIG. 11. Therefore, the presence of the channeled propagation that produces the axially directed amplified spectrum simultaneously acts to suppress the isotropic $Xe^{36+}$ emission. This spectral hole-burning is evidence for saturation of the $Xe^{36+}$ transition. The present inventors have not identified absorptions that mimic these observations; the scale length is too small in the transverse direction to present significant absorption [See, e.g., E. F. Plechaty et al., "Tables and Graphs of Photon-Interaction Cross Sections from 0.1 keV to 100 MeV Derived from the LLL Evaluated-Nuclear-Data Library," *Rev.* 3 Vol. 6 (UCRL-50400), (1981).]. Further inspection of the spectral comparison reveals that the $Xe^{34+}$ and $Xe^{35+}$ components manifest similar behavior. The $Xe^{35+}$ transition that exhibits the sharp spectral narrowing detailed in FIG. 11 shows a structured suppression. The suppressed $Xe^{35+}$ emission in spectrum (#4) displays two adjacent minima with a spectral separation of $\delta_a \cong 7$ eV, a splitting that exactly matches the shift between the two amplified $Xe^{35+}$ components identified in FIG. 11. Additionally, both components (A and B) of the $Xe^{34+}$ array that are prominent on film #2 in FIG. 11 are likewise strongly quenched in the transverse spectrum. The patterns for the observations for the $Xe^{34+}$, Xe 35+, and $Xe^{36+}$ transition arrays are correlated: they are (a) the axial line enhancements; (b) the corresponding spectral narrowings; and (c) the transverse spectral hole-burning which results in reversed spectral components.

The observation of the spectral hole-burning in FIG. 12b requires that the conditions for strong amplification in the channel be satisfied for a high fraction of the incident 248 nm pulses; otherwise, this phenomenon would be small when compared to the spontaneous emission signal that is produced by every pulse. In order to enhance the sensitivity of the detection of the spectral hole-burning signal for the collection of the data shown in FIG. 12b, the von Hámos spectrograph was employed to image along one spatial direction by orienting the transversely located spectrograph so that it imaged the spatial coordinate represented by the axis of the channel [See, e.g., A. B. Borisov et al., "Z-λ Imaging of Xe(M) and Xe(L) Emissions from Channeled Propagation of Intense Femtosecond 248 nm Pulses in a Xe Cluster Target," J. Phys. B 29, L113 (1996).]. Since a spatial resolution of less than ~100,m has been demonstrated in previous studies [See, e.g., A. B. Borisov et al., "Z-λ Imaging of Xe(M) and Xe(L) Emissions from Channeled Propagation of Intense Femtosecond 248 nm Pulses in a Xe Cluster Target," J. Phys. B 29, L113 (1996).] of Xe(L) emission from channels, isolation of the component of the transverse emission that arises from the terminal (exit) region of the channel, in which the amplified signal is strongest, and consequently, the saturation greatest, is readily achieved. The enhancement in the sensitivity to saturation can be effective, since this procedure automatically eliminates the detection of spontaneous emission signals for pulses that do not form a channel, as no channel exit zone is formed in the imaged region in that case.

H. Spatial Properties of the Amplified X-Ray Beam:

The propagating x-ray beam has been detected at two axial distances from the source, namely, (i) at ~2.5 cm with the 12.7 $\mu$m thick Ti foil located at the entrance plane of the von Hámos spectrograph, and (ii) at 12.5 cm with film packs incorporating a shield composed of a 12.7 $\mu$m thick Ti foil. Localized regions of spatially patterned damage that fully penetrate the Ti foil that protects the spectrograph (FIG. 2 hereof) has been observed. At full beam power, although the exposure of the Ti foil to the rapidly diverging 248 nm pulse exiting the channel (FIG. 4) creates a visible impression on the Ti surface with a spatial size of ~1 cm, the foil is robust and not breached by the incidence of the ultraviolet (248 nm) energy alone.

Figure 13:
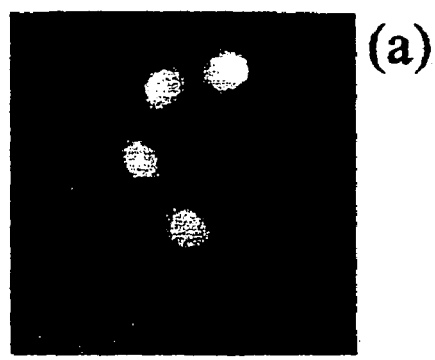
FIGS. 13a–13d are microscopic x-ray beam profile measurements from penetrating damage observed on the 12.7 μm Ti filter protecting the axially recording von Hámos spectrometer, where
FIG. 13e shows surface damage to the 12.7 □m thick Ti foil used to shield the film pack at an axial distance of ~12.5 cm from the source.
FIG. 13f shows the exposure recorded on the x-ray film directly behind the damaged region shown in FIG. 13e.
Figure 13:
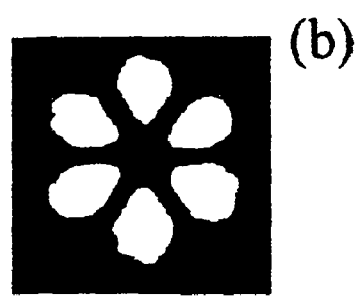
Figure 13:
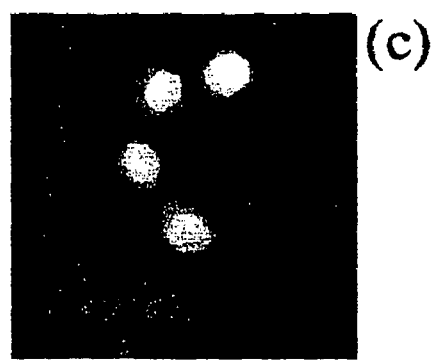
Figure 13:
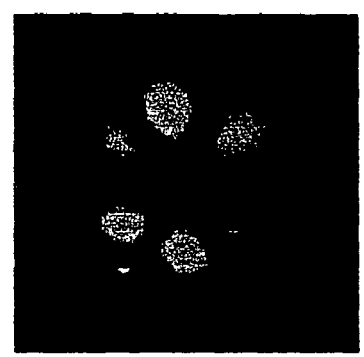
Figure 13:
Figure 13:

FIGS. 13a through 13d show microscopic x-ray beam profile measurements from penetrating damage observed on the 12.7 $\mu$m Ti filter protecting the axially recording von Hámos spectrometer for data set #11 (FIG. 2). The damaged regions illustrated are made visible by uniform backlighting under examination with a Nikon "Optiphot-2" equipped with a 60× objective. FIG. 13a shows a backlighted Ti foil revealing a circular distribution of penetrating damage having an individual feature size of ~1 $\mu$m and an overall diameter of ~5 $\mu$m. FIG. 13b is a photograph of a classic circular TEM 03 mode scaled to match the diameter of the pattern shown in FIG. 13a taken from the work of Rigrod [Appl. Phys. Lett 2, 51 (1963)]. FIG. 13c shows a superposition of FIGS. 13a and 13b and illustrates the correspondence of the patterns. FIG. 13d shows a comparative analogy with harmonic generation. A velocity matching condition is required to get efficient third harmonic generation in photonic crystal fibers. This analogous velocity matching condition, which is also established by higher-order mode formation, has been recently observed for third harmonic generation [See, e.g., Fiorenzo Omenetto et al., "Simultaneous Generation of Spectrally Distinct Third Harmonics in a Photonic Crystal Fiber," Opt. Lett. 26, 1158 (2001).]. The corresponding mode pattern shown provides evidence for the effectiveness of the mode formation mechanism for the provision of the needed velocity matching. It also shows that under real experimental conditions the lobes do not all have precisely identical shapes and intensities, a fact that can lead to the azimuthal dependence of the penetrating damage illustrated in FIG. 13a. FIG. 13e shows the surface damage to the 12.7 $\mu$m thick Ti foil used to shield the film pack at an axial distance of ~12.5 cm from the source. The feature shown was generated by two adjacently located similar exposures which produce a characteristic structured morphology. The damage does not penetrate the Ti foil. FIG. 13f is an exposure recorded on the x-ray film directly behind the damaged region shown in FIG. 13e. The morphology and spatial position of the exposure match the corresponding damaged zone on the Ti foil.

The damage observed in FIGS. 13a to 13d (1) matches well the morphology expected of a higher order spatial mode; and (2) are in good agreement with the scale size expected for a beam of ~2.9 Å radiation emitted from a small micron-scale (~3 $\mu$m diameter) channel. Importantly, the channel size is consistent with all previous determinations, (a) the upper bound of the channel diameter indicated in FIG. 4b; (b) the experimentally deduced value of the effective diameter of the 248 nm radiation propagating in the channel [See, e.g. A. B. Borisov et al., "Observation of Relativistic and Charge-Displacement Self-Channeling of Intense Subpicosecond Ultraviolet (248 nm) Radiation in Plasmas," Phys. Rev. Lett. 68, 2309 (1992).]; and (c) the theory of dielectric waveguides [See, e.g., Allan W. Snyder and John D. Love, Optical Waveguide Theory (Chapman and Hall, London/New York, 1983).]. For comparison, FIG. 13d illustrates the higher-order mode pattern observed [See, e.g., Fiorenzo Omenetto et al., "Simultaneous Generation of Spectrally Distinct Third Harmonics in a Photonic Crystal Fiber," Opt. Lett. 26, 1158 (2001).] in order to achieve an analogous velocity matching condition for third harmonic generation in a photonic crystal fiber. Based on an overall diameter of ~5 $\mu$m , the exposure presented in FIG. 13a represents a divergence angle of $\delta\theta_x$~0.2 mr.

FIGS. 13e and 13f are similar to many other features observed, so they are faithful representations of the properties of the x-ray beam. At this distance, the Ti foil is clearly damaged, but not fully penetrated. However, since the foil transmits the x-rays, a corresponding exposure with the identical shape appears on the film at exactly the same location. In order to get a good fingerprint match for identification, FIG. 13e illustrates a damaged region of the Ti that was generated by two adjacently located similar exposures which presents a characteristically structured binary pattern. The corresponding film exposure exhibits the same morphology, confirming the interpretation. The individual exposures typically recorded by damage to the foil had characteristic diameters of 20–25 $\mu$m. The corresponding divergence of the beam is ~0.2 mr, the same value that was independently measured at a distance of 2.5 cm on the Ti foil at the entrance of the von Hámos spectrograph (FIG. 13a).

The minimum x-ray energy necessary to produce the damaged zone shown in FIG. 13e is estimated to be between 10 and 20 $\mu$J; this gives approximately 100 J/cm$^2$ from the source (channel), a value that is consistent with the saturation level of 10 J/cm² and the observation of spectral hole-burning shown in FIG. 12b.

Figure 14:
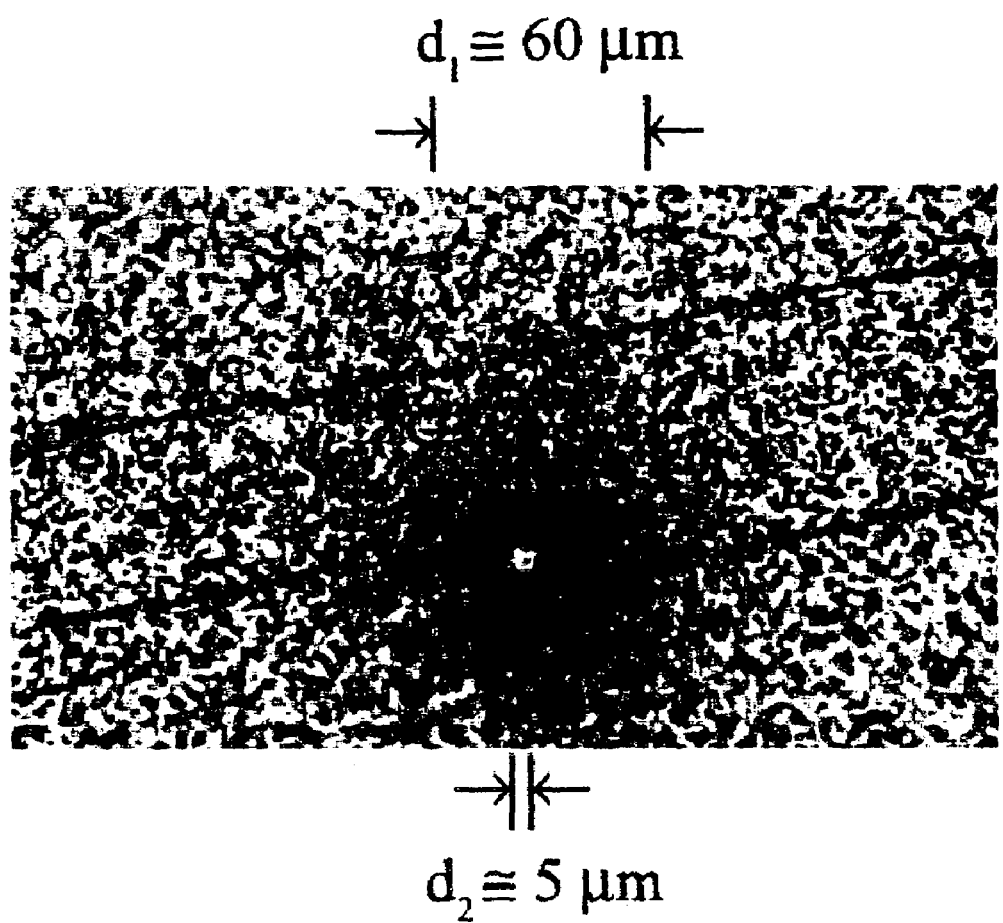
FIG. 14 shows microscopic examination under backlighting of the exposure on film #15 (FIG. 4b) of the $Xe^{32+}$ feature at 2.71 Å.

I. Peak Spectral Brightness Estimate:

Turning now to the intense exposure shown in FIG. 6b of the $Xe^{32+}$ line at ~2.71 Å, for higher spatial resolution than ~10 µm, a light microscope was used to view the negative directly. The microscopic examination of film #15 with backlighting revealed a 5 µm hole in the emulsion of the film at the exact center of the exposure, as shown in FIG. 14. This damage to the emulsion is surrounded by a zone corresponding to weaker illumination with a diameter $d_1 \cong 60$ µm. Damage to the film with this morphology could only be caused by a single pulse, since the channel spatial position certainly fluctuates more than 5 µm on a pulse-to-pulse basis. Furthermore, since the von Hámos spectrograph is a focusing instrument with 1:1 magnification, the 5 µm feature finds its natural interpretation as the image of the radiating aperture of the channel; this should be considered as an upper bound on the true size. The size of ~5 µm shown in FIG. 14 is consistent with the measured upper bound of ~6 µm for the channel represented in FIG. 4b.

The missing emulsion observed on film #15 gives a second independent method for estimating the x-ray pulse energy. Taking into account losses due to the filters and the efficiency η of the spectrometer ($\eta \cong 10^{-2}-10^{-3}$), an estimate of between 10 and 100 µJ can be obtained, an estimate that both (i) includes the range determined above from the damage on the Ti foils shielding the film packs (10–20 µJ) and (ii) is sufficient for the observation of spectral hole-burning.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for generating ultrabright multikilovolt coherent tunable radiation in the x-ray region of the electromagnetic spectrum, comprising:
   (a) generating pulsed laser radiation having a chosen power, pulsewidth and wavelength;
   (b) generating atomic clusters having a chosen size and density;
   (c) directing the laser radiation into the atomic clusters wherein rapid atomic excitation is generated having selected inner-shell electron atomic electrons being removed from the atoms without the removal of all of the electrons in the next outermost shell, thereby generating a population inversion from which a chosen wavelength of radiation is amplified or spontaneously generated in the x-ray region of the electromagnetic spectrum, and wherein the generated or amplified radiation is propagated in a self-trapped plasma channel region additionally having a nonlinear mode of confined propagation for the chosen wavelength of radiation; and
   (d) simultaneously controlling the density of said atomic clusters, the density of plasma electrons, and the laser radiation such that the wavelength of amplification is defined.

2. The method as described in claim 1, wherein the cluster size is chosen to minimize the laser intensity required to excite substantially all of the atoms in the cluster.

3. The method as described in claim 1, wherein the pulsewidth is chosen such that atomic excitation occurs on a timescale which is short compared with recombination processes in the plasma produced.

4. The method as described in claim 3, wherein the pulsewidth is less than 1 ps.

5. The method as described in claim 1, wherein the power and wavelength of the laser radiation, and the atoms in the clusters are chosen such that the desired x-ray wavelength is generated.

6. The method as described in claim 5, wherein the atoms in the atomic clusters are heavy atoms.

7. The method as described in claim 6, wherein the atoms include Xe and the laser radiation includes 248 nm radiation.

8. An apparatus for generating ultrabright multikilovolt coherent tunable radiation in the x-ray region of the electromagnetic spectrum, comprising in combination:
   (a) a pulsed laser for generating radiation having a chosen power, pulsewidth and wavelength;
   (b) means for generating atomic clusters having a chosen size and density; and
   (c) means for directing the laser radiation into the atomic clusters wherein rapid atomic excitation is generated having selected inner-shell electron atomic electrons being removed from the atoms without the removal of all of the electrons in the next outermost shell, thereby generating a population inversion from which a chosen wavelength of x-radiation is amplified or spontaneously generated, and wherein the laser generated or amplified radiation is propagated in a self-trapped plasma channel region additionally having a nonlinear mode of confined propagation for the chosen wavelength of x-radiation; whereby it the density of said atomic clusters, the density of plasma electrons, and The laser radiation are simultaneously controlled, the spectrum of x-ray amplification is defined.

9. The apparatus as described in claim 8, wherein the duster size is chosen to minimize the laser intensity required to excite substantially all of the atoms in The cluster.

10. The apparatus as described in claim 8, wherein the pulsewidth of the laser is chosen such that atomic excitation occurs on a timescale which is short compared with recombination processes in the plasma produced.

11. The apparatus as described in claim 10, wherein the pulse width is less than 1 ps.

12. The apparatus as described in claim 8, wherein the intensity and wavelength of the laser radiation, and the atoms in the clusters are chosen such that the desired x-ray wavelength is generated.

13. The apparatus as described in claim 8, wherein the atoms in the clusters are heavy atoms.

14. The apparatus as described in claim 13, wherein the atoms include Xe and the laser radiation includes 248 nm radiation.

* * * * *